US009886848B2

(12) United States Patent
Lee et al.

(10) Patent No.: US 9,886,848 B2
(45) Date of Patent: Feb. 6, 2018

(54) MOBILE TERMINAL AND CONTROL SYSTEM

(71) Applicant: LG ELECTRONICS INC., Seoul (KR)

(72) Inventors: Kyechul Lee, Seoul (KR); Jihye Park, Seoul (KR); Sunghyuk Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 14/622,573

(22) Filed: Feb. 13, 2015

(65) Prior Publication Data

US 2015/0364037 A1   Dec. 17, 2015

(30) Foreign Application Priority Data

Jun. 12, 2014 (KR) ........................ 10-2014-0071631

(51) Int. Cl.
*H04N 7/18* (2006.01)
*G06F 3/0488* (2013.01)
(Continued)

(52) U.S. Cl.
CPC ............. *G08C 23/02* (2013.01); *G08C 17/02* (2013.01); *G08C 23/04* (2013.01);
(Continued)

(58) Field of Classification Search
CPC ........ G06F 1/3287; G06F 3/011; G08C 23/02
See application file for complete search history.

(56) References Cited

U.S. PATENT DOCUMENTS

2008/0261693 A1* 10/2008 Zalewski .............. G06F 3/0304
463/31
2009/0316671 A1* 12/2009 Rolf ........................ H04W 4/02
370/338
(Continued)

FOREIGN PATENT DOCUMENTS

KR    10-2014-0069124    6/2014

OTHER PUBLICATIONS

PCT International Application No. PCT/KR2014/012364, Written Opinion of the International Searching Authority dated Mar. 6, 2015, 10 pages.

*Primary Examiner* — Sath V Perungavoor
*Assistant Examiner* — Patricia I Young
(74) *Attorney, Agent, or Firm* — Lee, Hong, Degerman, Kang & Waimey

(57) ABSTRACT

A mobile terminal includes a wireless communication unit; a camera; a display; an ultrasound transmission unit; and a controller configured to control the wireless communication unit, the camera, the display, and the ultrasound transmission unit. The mobile terminal is configured to: transmit a first detection prepare request signal to allow a plurality of external devices located within a control area to switch to a prepare state; acquire an image including at least one of the plurality of external devices that switches to the prepare state; selectively transmit an ultrasound signal to the at least one of the plurality of external devices included in the image; receive associated control information from each of the at least one of the plurality of external devices; and display a graphic image related to the associated control information from each of the at least one of the plurality of external devices.

15 Claims, 24 Drawing Sheets

(51) Int. Cl.
A63F 13/00 (2014.01)
G08C 23/02 (2006.01)
G08C 17/02 (2006.01)
G08C 23/04 (2006.01)
H04N 5/232 (2006.01)

(52) U.S. Cl.
CPC ..... *H04N 5/23203* (2013.01); *G08C 2201/20* (2013.01); *G08C 2201/93* (2013.01); *H04N 5/23293* (2013.01)

(56) References Cited

U.S. PATENT DOCUMENTS

| | | | |
|---|---|---|---|
| 2013/0229508 A1* | 9/2013 | Li | G06F 1/3287 348/77 |
| 2014/0085190 A1 | 3/2014 | Erinjippurath et al. | |
| 2014/0146124 A1 | 5/2014 | Jang et al. | |
| 2014/0258926 A1* | 9/2014 | Min | G06F 3/0482 715/808 |
| 2014/0361988 A1* | 12/2014 | Katz | G06F 3/011 345/156 |

* cited by examiner

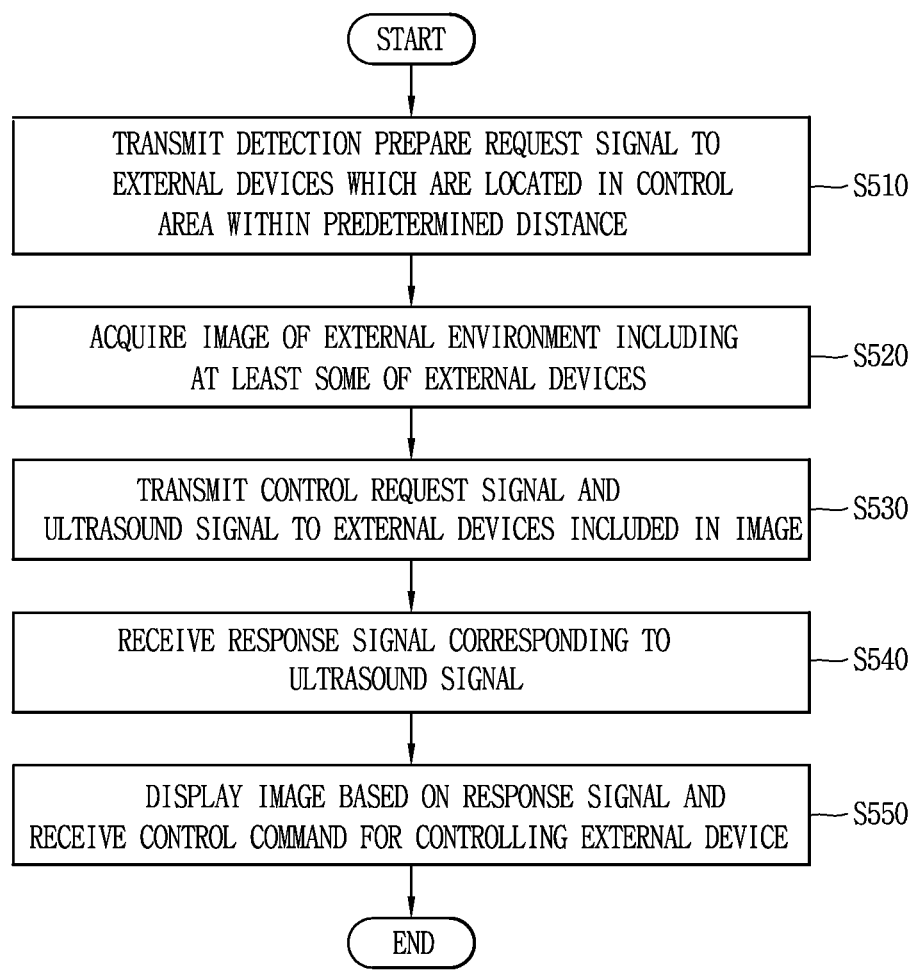

MOBILE TERMINAL AND CONTROL SYSTEM

CROSS-REFERENCE TO RELATED APPLICATION

Pursuant to 35 U.S.C. § 119(a), this application claims the benefit of earlier filing date and right of priority to Korean Application No. 10-2014-0071631, filed on Jun. 12, 2014, the contents of which is incorporated by reference herein in its entirety.

BACKGROUND OF THE DISCLOSURE

1. Field of the Disclosure

The present disclosure relates to a mobile terminal for designating and controlling an external device.

2. Background of the Disclosure

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast or the like. Furthermore, structural and software modifications to the mobile terminal are considered for supporting and improving functions of the mobile terminal.

Recently, research for interoperation with a device is done, and thus, technology for controlling household appliances with a mobile terminal is implemented. For example, a method is being applied in which household appliances are previously set (for example, a serial number is given to a household appliance) by a user, and a control command is transmitted as a radio frequency (RF) signal, or an application applied to only each household appliance is driven.

However, in the method, household appliances to be controlled later should be previously set by a user, and the user itself should remember kinds and control methods of the household appliances set by the user.

SUMMARY OF THE DISCLOSURE

Therefore, an aspect of the detailed description is to provide a mobile terminal that controls a device which is visually perceived by a user through the mobile terminal.

To achieve these and other advantages and in accordance with the purpose of this specification, as embodied and broadly described herein, a mobile terminal includes: a body; a wireless communication unit configured to transmit a detection prepare request signal which allows a plurality of external devices, located in a control area within a predetermined distance, to switch to a prepare state; a camera mounted on one side of the body, and configured to acquire an image including at least some of the plurality of external devices switching to the prepare state; a display unit configured to display the image; an ultrasound transmission unit mounted on the one side, and configured to selectively transmit an ultrasound signal to some external devices included in the image among the plurality of external devices; and a control unit configured to, based on the ultrasound signal, control the wireless communication unit to receive control information of the some external device from the some external devices, and control the display unit to display a graphic image including the control information.

The control unit may transmit the detection prepare request signal and then transmits the ultrasound signal, and the control unit may control the wireless communication unit to receive timestamp information in which the ultrasound signal and the control request signal are transferred to the some external devices. Accordingly, distances between the mobile terminal and the external devices may be calculated, and thus, an external device displayed on the image may be designated.

The control unit may control the wireless communication unit to transmit a control request signal to the plurality of external devices after the detection prepare request signal is transmitted. Therefore, the mobile terminal may transmit the control request signal and immediately transmit the ultrasound signal, and thus, a buffer can be prevented from occurring when the control request signal and the ultrasound signal are continuously output. Accordingly, an accuracy of calculation of a distance can be enhanced.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 3A is a flowchart of a control method of the mobile terminal according to an embodiment of the present invention;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1A:
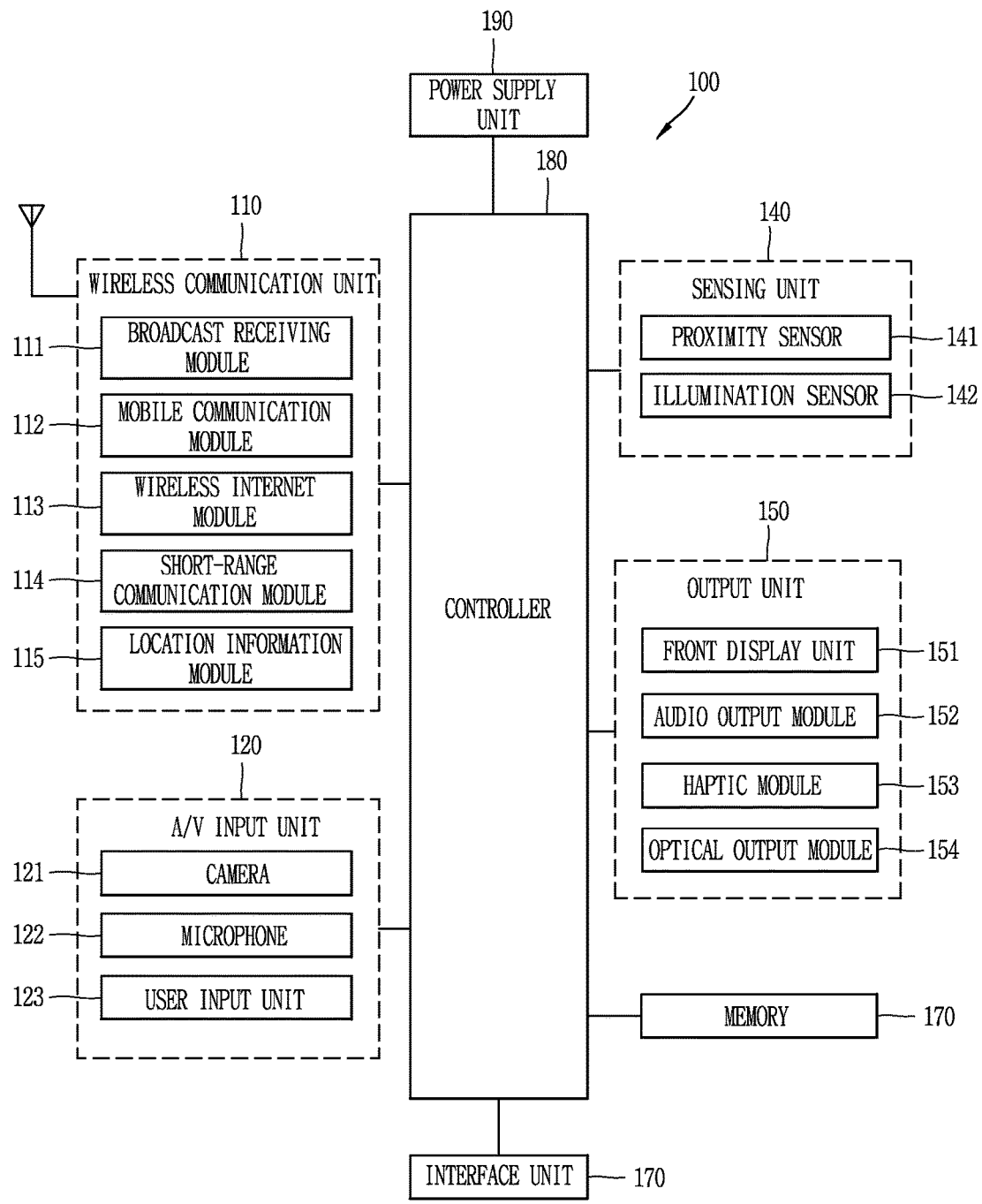
FIG. 1A is a block diagram for describing a mobile terminal according to an embodiment of the present invention.
Figure 1B:
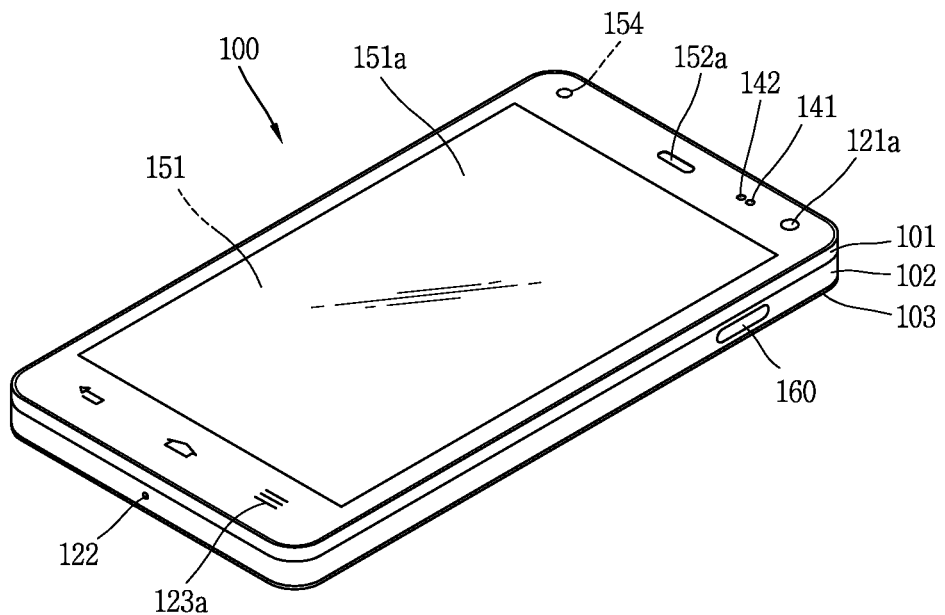
FIGS. 1B and 1C are conceptual views in which the mobile terminal according to an embodiment of the present invention are viewed in different directions.
Figure 1C:
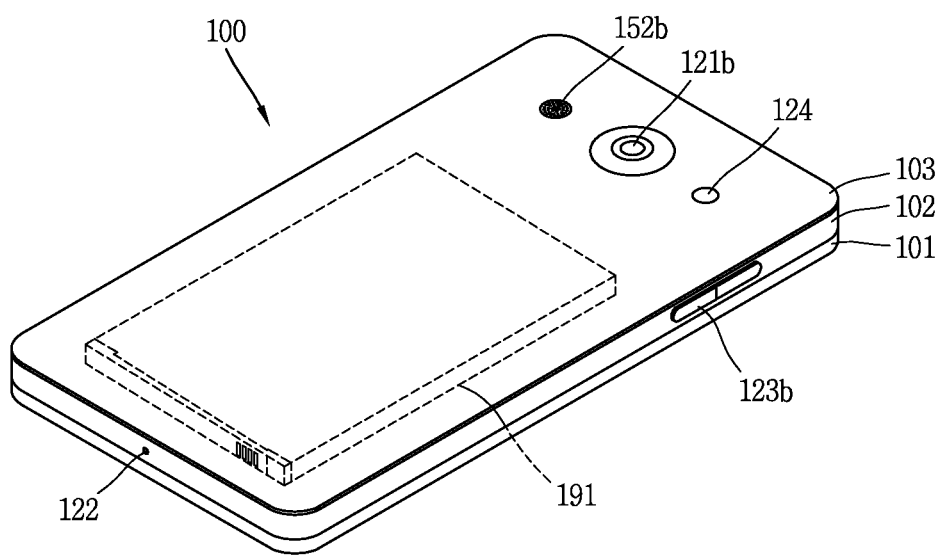
Figure 2:
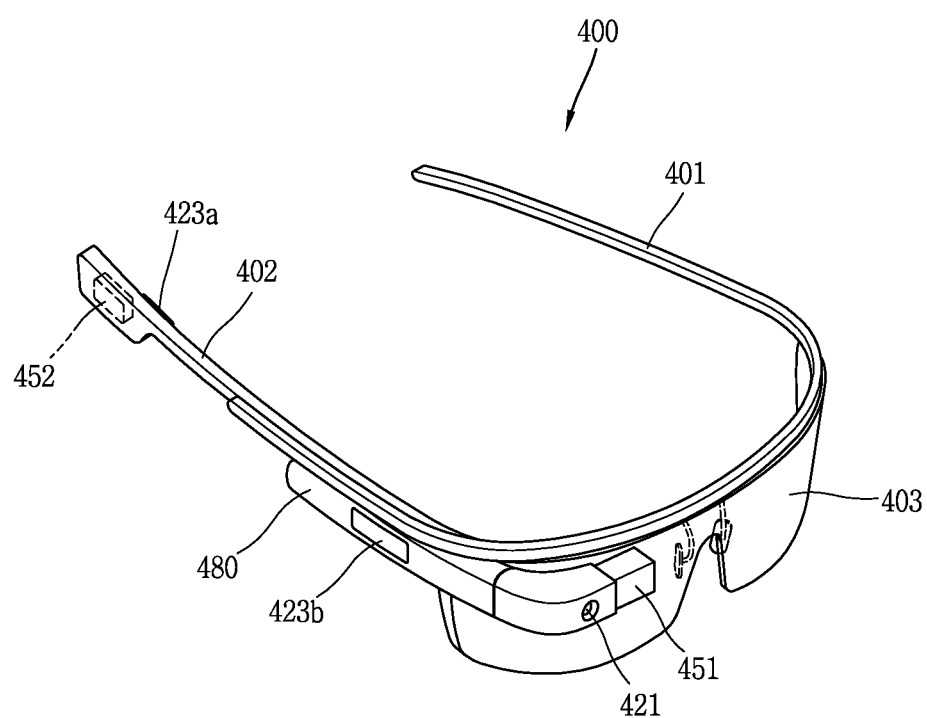
FIG. 2 is a perspective view illustrating an example of a glass type mobile terminal according to another embodiment of the present invention.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly as mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body.

And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A mobile terminal 100 according to an embodiment of the present invention includes a function of inputting a letter, based on a touch input applied to the display unit 151. While a user applies a touch input to a specific area of the display unit 151 to input a letter, the present invention displays an editing state of the letter which is input adjacent to the specific area to which the touch input is applied. Hereinafter, according to various embodiments of the present invention, a control method of outputting an editing state bar 510 will be described in detail.

A mobile terminal according to an embodiment of the present invention transmits or receives a signal to or from a wireless communication-enabled external device to determine a position of the external device, and transmits a control command so as to control the external device. Hereinafter, a control method of the mobile terminal will be described in detail.

Figure 3B:
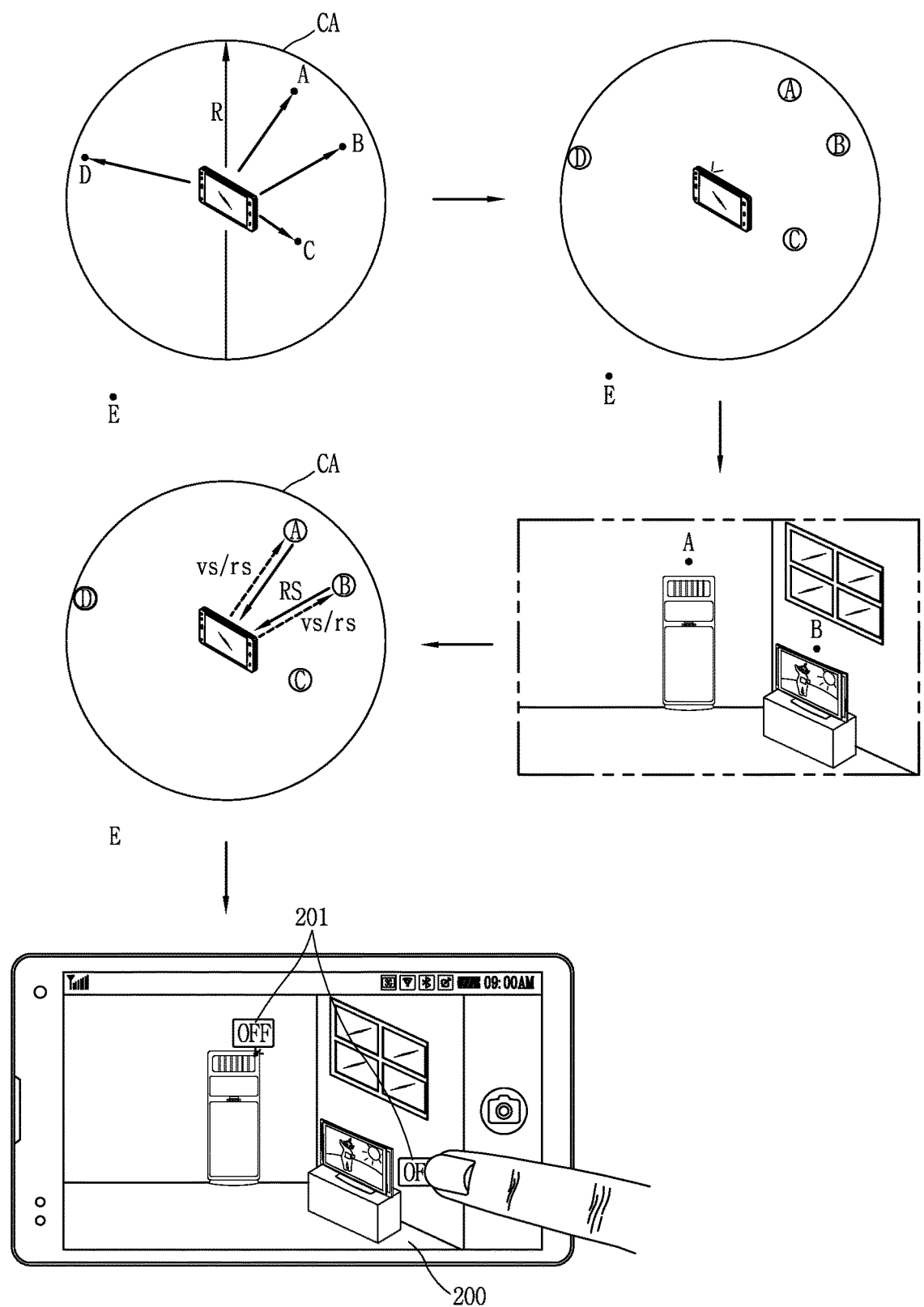
FIG. 3B is a conceptual view for describing the control method of FIG. 3A according to an embodiment of the present invention.
Figure 3C:
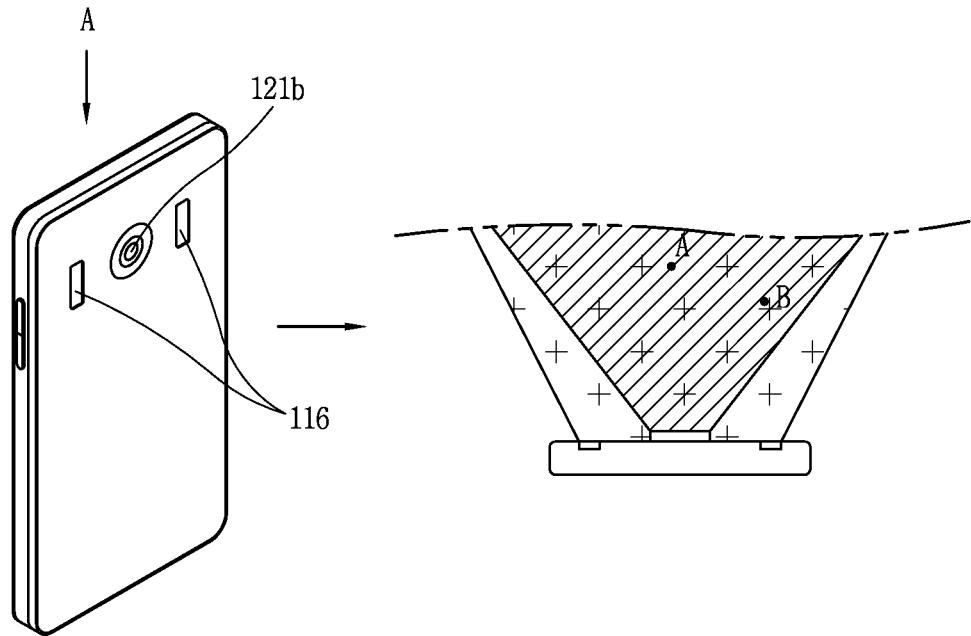
FIGS. 3C(a) and 3C(b) are conceptual views for describing an arrangement structure of a camera and a wireless communication unit.
Figure 3C:
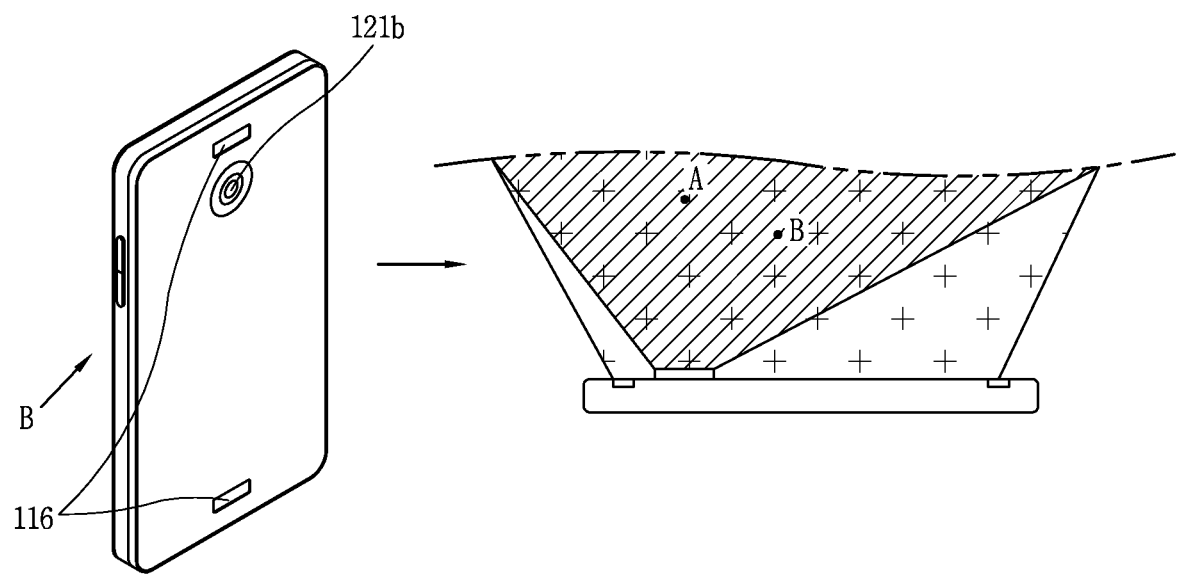

FIG. 3A is a flowchart of a control method of the mobile terminal according to an embodiment of the present invention, and FIG. 3B is a conceptual view for describing the control method of FIG. 3A according to an embodiment of the present invention. FIG. 3C is a conceptual view for describing an arrangement structure of a camera and a wireless communication unit.

Referring to FIGS. 3A and 3B, in operation S510, a wireless communication unit 110 transmits a detection prepare request signal DPR to a plurality of external devices which are located in a control area within a predetermined distance. Here, each of the plurality of external devices includes a receiver that receives the detection prepare request signal DPR transmitted from the mobile terminal 100. Also, each of the plurality of external devices includes a transmitter that transmits another signal corresponding to the signal received from the mobile terminal 100.

The detection prepare request signal DPR may be implemented as a radio frequency (RF) signal. The RF signal corresponds to a high frequency signal which is used for wireless communication. In detail, the mobile terminal 100 transmits the RF signal to the transmitter of the external device which is located within a predetermined distance R from the wireless communication unit 110. That is, the detection prepare request signal DPR is transmitted with no directionality with respect to the mobile terminal 100.

A control area CA within the predetermined distance R may be set as an area to which the mobile terminal 100 transmits the RF signal. That is, the control area CA is determined based on a predetermined intensity of the detection prepare request signal DPR, but the present embodiment is not limited thereto. For example, the control area CA may be defined as a specific distance by a user, based on a photographing distance of the camera and a focal distance of the user's eyes. Therefore, among a plurality of external devices A to E, the external device E cannot receive the detection prepare request signal DPR.

The detection prepare request signal DPR requests the external device for a switch to a detection prepare state. The plurality of external devices receiving the detection prepare request signal DPR transmit a detection prepare response signal DPS to the mobile terminal 100. The detection prepare response signal DPS may include approval information or error information. That is, when the external device receives the detection prepare request signal DPR and switches to the detection prepare state, the external device transmits the detection prepare response signal DPS including the approval information, but when the external device cannot switch to the detection prepare state, the external device transmits the detection prepare response signal DPS including the error information. Here, the error information corresponds to a case in which the external device cannot switch to the detection prepare state, and in detail, the error information may correspond to a case, in which the external device is processing another signal, or a case in which collision occurs between another signal and the detection prepare request signal DPR.

In response to the detection prepare response signal DPS, the external device maintains the detection prepare state during a predetermined time.

In response to the transmitted detection prepare request signal DPR, an option for retransmitting the detection prepare request signal DPR to the external device is generated. When the detection prepare request signal DPR is retransmitted, a control unit 180 reduces a valid time in which a retransmission option for the detection prepare request signal is generated. Therefore, the control unit 180 may transmit the detection prepare request signal DPR to the external device a predetermined number of times.

The mobile terminal 100 switching to the detection prepare state is controlled to preferentially process a wireless signal from a mobile terminal which transmits the detection prepare request signal DPR and then process another request.

In operation S520, a camera 121 of the mobile terminal 100 acquires an image of an external environment including at least some A and B of the plurality of external devices A to E. In detail, the image of the external environment is acquired by using a rear camera 121*b*. Referring to FIG. 1C, the rear camera 121*b* is disposed at a rear surface of a terminal body which is disposed on the reverse of the display unit 151. The camera 121 has a predetermined viewing angle. Only an image of at least some A and B of the external devices A to D, which switch to the detection prepare state, may be acquired according to the viewing angle of the rear camera 121.

In operation S530, the wireless communication unit 110 transmits a control request signal rs and an ultrasound signal us to the external devices A to B included in the image. That is, the external device switching to the detection prepare state stands by for receiving the control request signal rs. The wireless communication unit 110 transmits the control request signal rs, and immediately transmits the ultrasound signal us. The control request signal rs may be implemented as an RF signal, and a transmission intensity of the control request signal rs is substantially the same as that of the detection prepare request signal DPR. The control request signal rs is transmitted to the plurality of external devices switching to the detection prepare state.

The ultrasound signal us has directionality and is transmitted to some of the plurality of external devices. Referring to FIG. 3C, an ultrasound transmission unit may be disposed at a rear surface of the terminal body in which the rear camera 121 is provided. For example, the ultrasound transmission unit may include a pair of transmission members which are disposed to be separated from each other, in order for the ultrasound signal to be transmitted from the mobile terminal 100 to an enlarged area.

Referring to FIG. 3C (a), the pair of transmission members may be disposed with the rear camera 121*b* therebetween and along a width direction of the mobile terminal 100. When the mobile terminal 100 is seen in an A direction, the pair of transmission members may be disposed so that a range, in which an image is acquired according to the viewing angle of the rear camera 121b, is substantially the same as a transmission area which is formed by the pair of transmission members.

Referring to FIG. 3C (b), the pair of transmission members may be disposed with the rear camera 121b therebetween and along a length direction of the mobile terminal 100. A distance between the pair of transmission members may be adjusted based on the viewing angle of the rear camera 121b. For example, the pair of transmission members may be disposed to be adjacent to respective corners of the mobile terminal 100.

The control unit 180 may transmit the ultrasound signal us to the external devices A and B included in the image acquired by the rear camera 121b.

The operations may be sequentially performed for a very short time. For example, an operation of transmitting the detection prepare request signal DPR and an operation of acquiring an image 200 may be simultaneously performed, or an operation of acquiring the image 200 may be performed prior to the operation of transmitting the detection prepare request signal DPR.

Since the detection prepare request signal DPR is transmitted and the control request signal rs is immediately transmitted, the detection prepare request signal DPR and the control request signal rs may be substantially transmitted to the external device at the same time.

Referring to FIG. 3A, the control unit 180 may control the display unit 151 so as to display a plurality of graphic images 201 on the image 200. The control unit 180 matches a response signal RS with an external device included in the image 200, based on the response signal RS. Therefore, the control unit 180 controls the display unit 151 so as to display, on the image 200, a graphic image 201 indicating information included in the response signal RS. For example, the graphic image 201 may be displayed in a certain area of the display unit 151 in which the external device is displayed.

Hereinafter, a control method of matching a response signal RS with an external device and a method of outputting a graphic image will be described in detail with reference to FIGS. 5A and 5B.

Referring to FIG. 3B, the control unit 180 may collect product information and control information (an OFF state) of an air conditioner and a television (TV), based on a response signal RS received from the air conditioner and the TV. The control unit 180 controls the display unit 151 so that a graphic image (OFF) 201 indicating a power-off control state is displayed to overlap the air conditioner and the TV included in the image 200, based on the control information.

The mobile terminal receives a control command cc for controlling the external device. In detail, the display unit 151 receives the control command cc which is input as a touch input applied to a certain area of the display unit 151. For example, the graphic image 201 may be constructed to receive a touch input for controlling a corresponding external device. When a touch input is applied to the graphic image 201 which is displayed to overlap the TV included in the image 200, a control signal for controlling the TV may be generated. The control unit 180 may control the wireless communication unit 110 so as to transmit the control signal, generated based on the control command cc, to a corresponding external device.

Although not shown in detail, the control unit 180 may control the display unit 151 so as to change information displayed on the graphic image, based on the control command cc. For example, when a touch input is received by the graphic image 201 indicating an OFF state, the control unit 180 controls the display unit 151 so as to switch the graphic image 201 to an ON state.

The control unit 180 may transmit the control signal to the external device corresponding to the graphic image 201. Also, the mobile terminal 100 may receive a response signal RS including data about a control state which is changed according to the control signal. The control unit 180 may control the display unit 151 so as to change the graphic image 201, based on the response signal RS including the changed data.

According to an embodiment of the present invention, the control unit 180 may designate an external device which is located in a field of view which the user looks at through the camera and the mobile terminal, and may selectively control the external device. Therefore, the user may not previously designate and store an external device, for controlling the external device by using the mobile terminal.

In a state where the user looks at the external device through the mobile terminal, the user may control the external device by applying a touch input to an image of the external device which is displayed by the display unit, and thus, a control signal is more intuitively transmitted to the external device.

Moreover, the mobile terminal receives only information of an external device which the user looks at through the mobile terminal to generate a control command, and thus prevents undesired information from being received, thereby more accurately controlling a device.

Figure 3D:
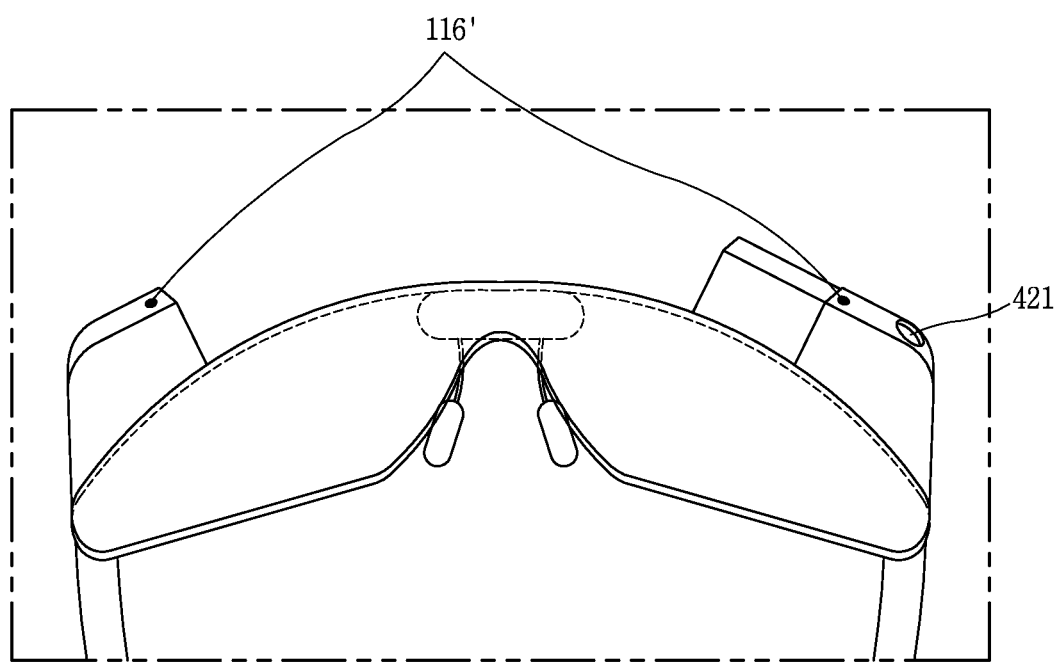
FIG. 3D is a conceptual view of a glass type mobile terminal including a pair of transmission members.

FIG. 3D is a conceptual view of a glass type mobile terminal including a pair of transmission members. The glass type mobile terminal according to an embodiment of the present invention includes a pair of transmission members 116' which are disposed at positions corresponding to both eyes, respectively. The pair of transmission members 116' may be disposed to be separated from each other by the substantially same distance from the center of a user's face.

The pair of transmission members 116' transmit the control request signal rs in a predetermined direction. That is, the pair of transmission members 116' transmits the control request signal rs to an external device which is disposed in an external environment perceived with the both eyes. Among a plurality of external devices switching to the detection prepare state, only some external devices which are disposed in a direction viewed by the user may transmit the control request signal rs.

Figure 3E:
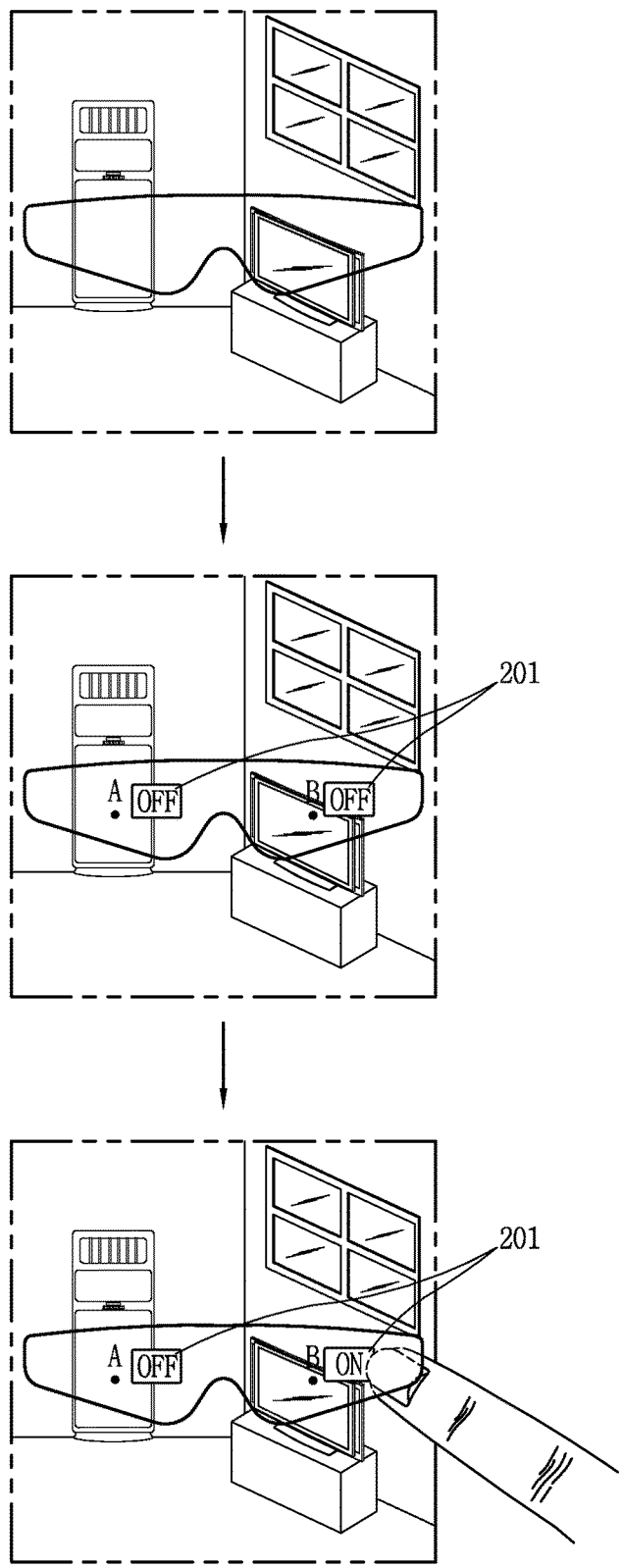
FIG. 3E is a conceptual view for describing a control method of controlling an external device by using the glass type mobile terminal.

FIG. 3E is a conceptual view for describing a control method of controlling an external device by using the glass type mobile terminal.

The transmission members 116' transmit the control request signal at a predetermined angle, and thus, the control request signal rs is transmitted to an external device within a field of view of the user. Some of a plurality of external devices transmitting the control request signal rs transmit the response signal RS to the mobile terminal.

The control unit 180 of the mobile terminal displays the graphic image 201 in a display unit 451 by using the response signal RS. The control unit 180 controls the display unit 451 so as to display the graphic image 201 at a position which overlaps the external device. That is, the user allows the external device to overlap the graphic image 201.

In a state where the graphic image 201 is output, the control unit 180 recognizes the user's gesture, and controls the mobile terminal so as to generate a control signal. For example, in a state where the graphic image 201 is output, the control unit 180 may activate a camera 421 so as to sense a user's hand. For example, in a state where the graphic image 201 is output, when the user's hand is located to overlap the external device, the control unit 180 may generate a control signal for the overlapped external device. Alternatively, the control unit 180 may sense the user's hand being located at a position which overlaps the graphic image 201, thereby generating the control signal.

Although not shown, the control command cc may be input as a voice. For example, the control unit 180 may designate an external device to be controlled and generate a control signal for the external device, based on the response signal RS received from the external device and the user's voice command sensed by a microphone.

According to the present embodiment, although the camera of the glass type mobile terminal does not photograph an external environment, a user may receive information of an external device which is seen with eyes. Also, the user can more conveniently control an external device located within a field of view by using a gesture or a voice.

Figure 4A:
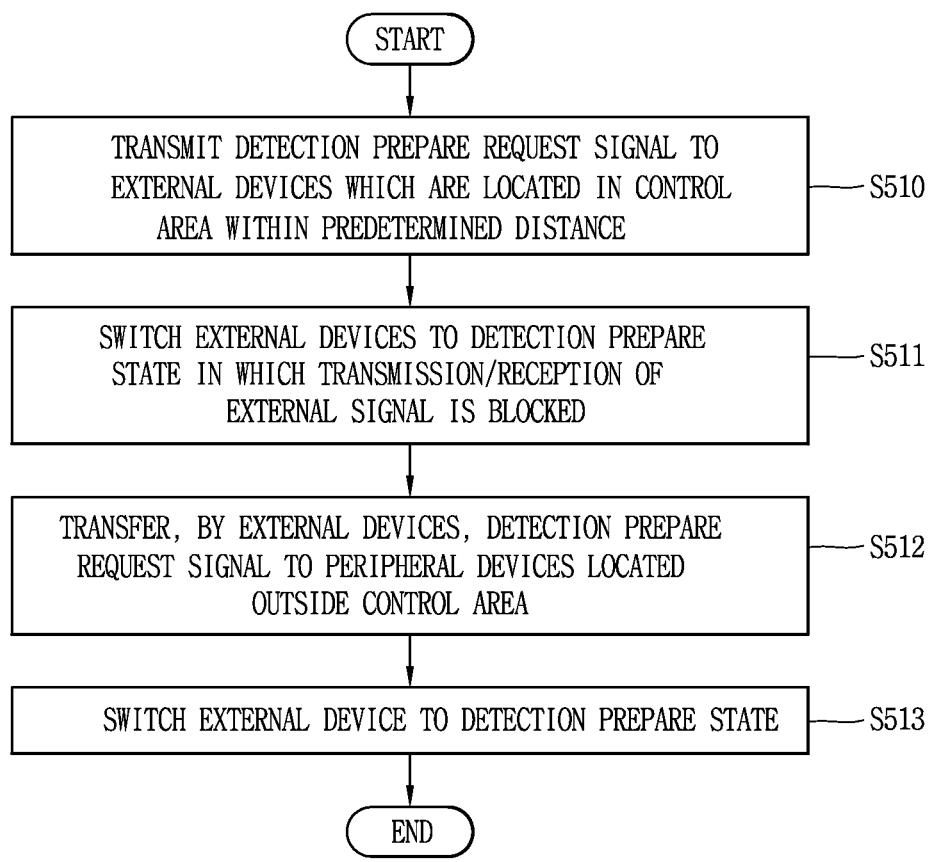
FIG. 4A is a flowchart for describing a control method of switching a plurality of external devices to a detection prepare state.
Figure 4B:
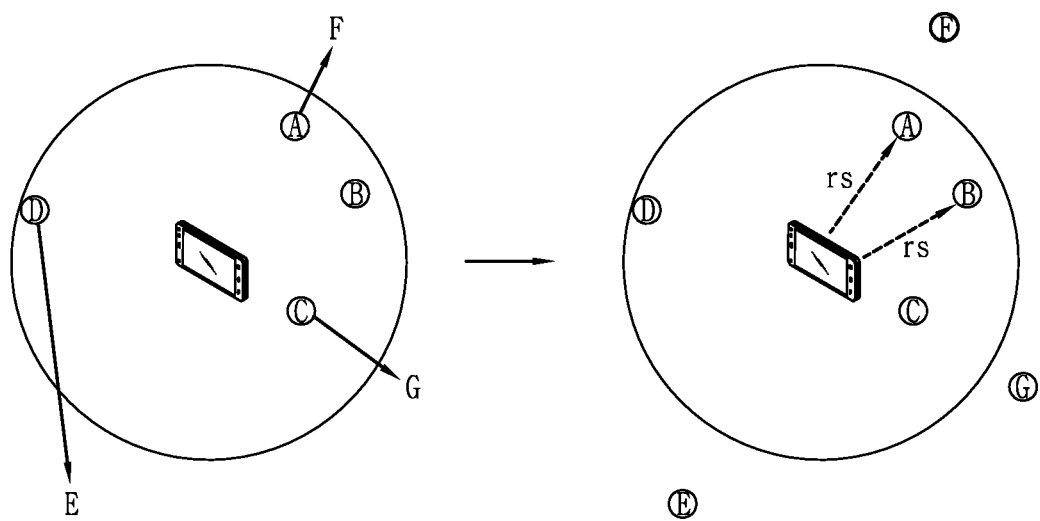
FIG. 4B is a conceptual view for describing the control method of FIG. 4A.

FIG. 4A is a flowchart for describing a control method of switching a plurality of external devices to a detection prepare state, and FIG. 4B is a conceptual view for describing the control method of FIG. 4A.

In operation S510, the control unit 180 transmits a detection prepare request signal DPR to a plurality of external devices which are located within a predetermined distance (a control area CA). In operation S511, The plurality of external devices receiving the detection prepare request signal DPR switch to a detection prepare state in which transmission/reception of an external signal is blocked. That is, the external device is controlled to preferentially receive an RF signal transmitted from the mobile terminal or to preferentially transmit an RF signal to the mobile terminal.

In operation S512, the plurality of external devices transfer a prepare signal to a plurality of peripheral devices E and G located outside the control area CA. That is, an external device receiving the detection prepare request signal DPR transfers the detection prepare request signal DPR to an external device adjacent to a corresponding external device. Therefore, a plurality of peripheral devices E to G switch to the detection prepare state. Accordingly, it is limited that the peripheral devices E to G transmit or receive an RF signal to or from the external devices A to D, and thus, the RF signal can be more effectively prevented from being transmitted to the external device A to D switching the detection prepare state.

Referring to FIG. 4B, the control unit 180 of the mobile terminal controls the wireless communication unit 110 so as to transmit the control request signal rs to the external devices A to D. That is, the control request signal rs is not transmitted to the peripheral devices E to G. Therefore, the peripheral devices E to G are located in a field of view of the user, or when the peripheral devices E to G are sensed by the rear camera 121*b*, the peripheral devices E to G switch to the detection prepare state, but it is impossible to control the peripheral devices E to G.

The control unit 180 matches information, included in the response signal RS, with the external device by using timestamp information included in the response signal RS. Hereinafter, a control method of designating an external device by using the timestamp information will be described in detail.

Figure 5A:
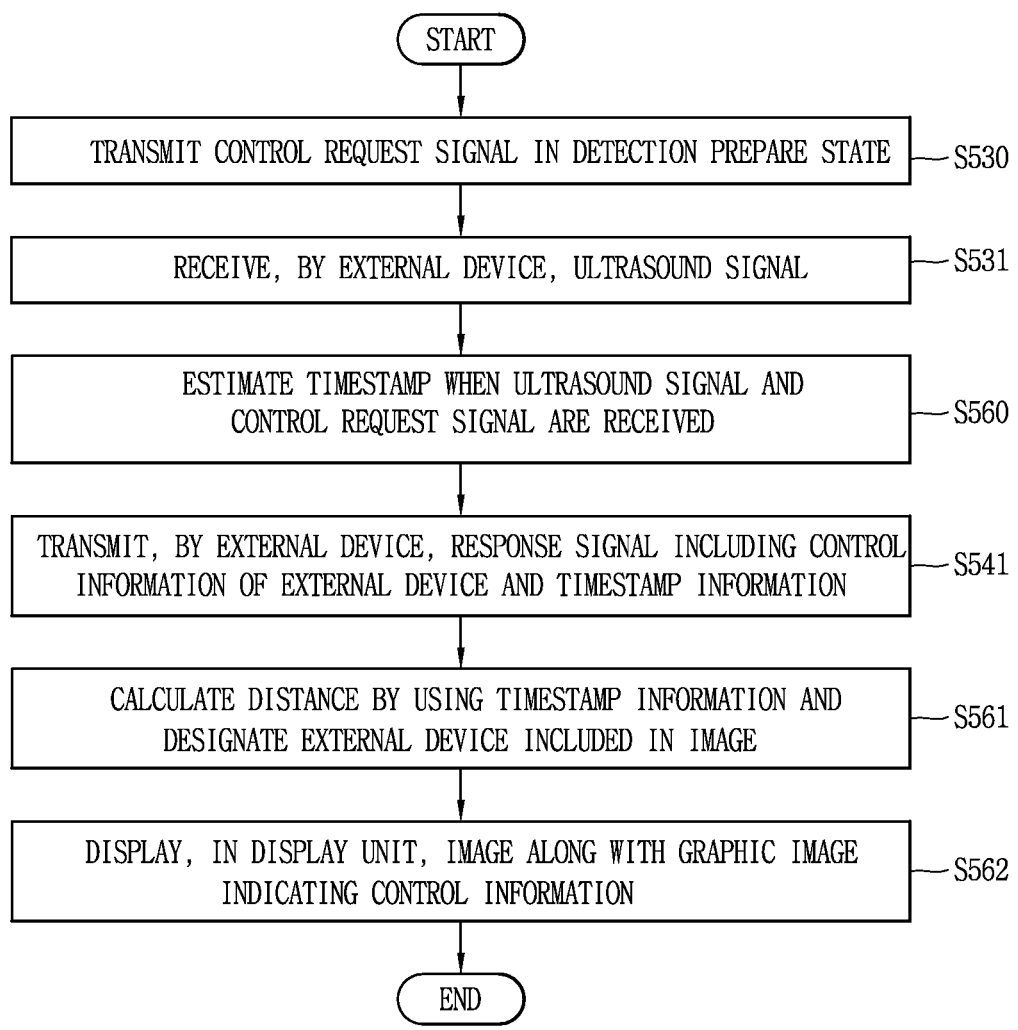
FIG. 5A is a flowchart for describing a control method of designating an external device by using a response signal.
Figure 5B:
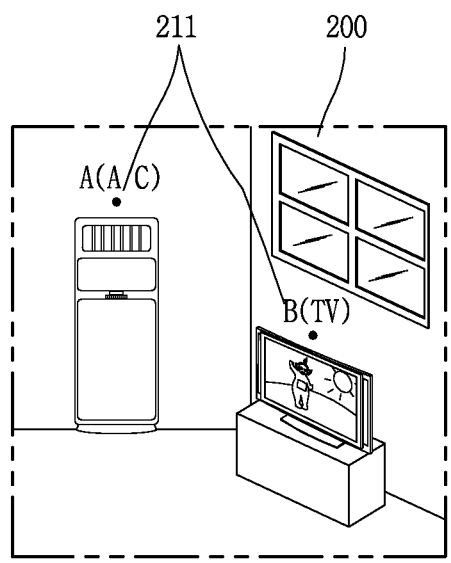
FIGS. 5B(a), 5B(b), and 5B(c) are conceptual views for describing a control method of outputting a graphic image corresponding to an external device.
Figure 5B:
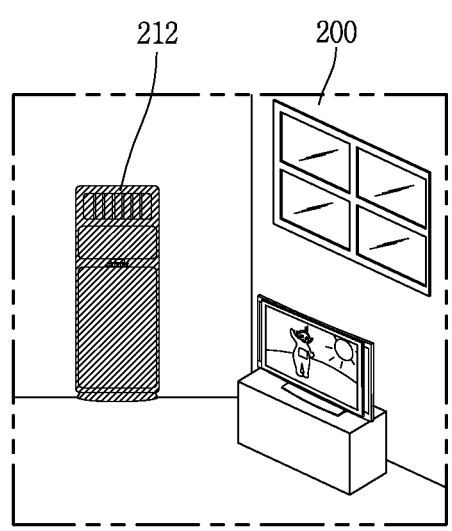
Figure 5B:
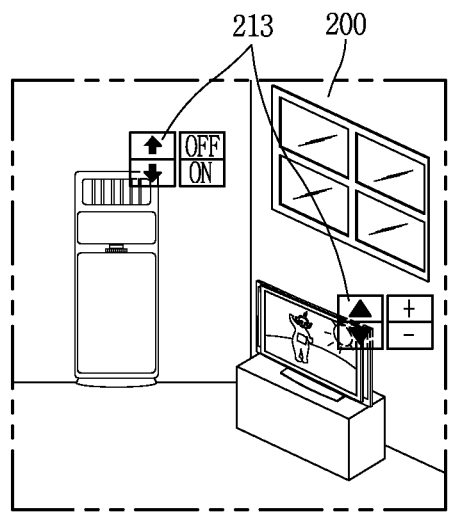

FIG. 5A is a flowchart for describing a control method of designating an external device by using a response signal, and FIG. 5B is a conceptual view for describing a control method of outputting a graphic image corresponding to an external device.

Referring to FIG. 5A, when the external device receiving the detection prepare request signal DPR switches to the detection prepare state, the external device receives the control request signal rs in operation S530. The control request signal rs may be transmitted to a plurality of external devices switching to the detection prepare state.

Some of the external devices receive the ultrasound signal us S531. The wireless communication unit 110 of the mobile terminal transmits the control request signal rs, and immediately transmits the ultrasound signal us. Here, when a mobile terminal is a glass type mobile terminal 400, some of the external devices receiving the ultrasound signal us may be determined based on a look direction of the user, and when a mobile terminal is the mobile terminal 200 including the camera 121, some of the external devices receiving the ultrasound signal us may be determined based on a photographing direction of the camera 121.

While the rear camera 121*b* is being activated, the control unit 180 may activate a front camera 121*a* to sense motions of pupils of the user. That is, the control unit 180 may determine a place in which the user's eyes are located, by using the front camera 121*a*, and control a direction, in which the ultrasound signal us is transmitted, according to the user's eyes. When the front camera 121*a* and the rear camera 121*b* are activated, the control unit 180 determines motions of the eyes, and more accurately transmits the ultrasound signal us to an external device which the user looks at.

In operation S560, some of the external devices receiving the ultrasound signal us estimate a timestamp in which the ultrasound signal us and the control request signal rs are received. The ultrasound signal us and the control request signal rs are different kinds of RF signals, and thus are transferred to the external device at different speeds. The external device may generate timestamp information based on a difference in which the ultrasound signal us and the control request signal rs are received.

A distance from the mobile terminal 100 to the external device may be calculated based on a timestamp in which the ultrasound signal us and the control request signal rs are transferred to the external device S561. Also, timestamps of the plurality of external devices which are separated from the mobile terminal 100 by different distances are differently measured. The control unit 180 may sense a relative distance from the mobile terminal 100 to each of the external devices by using timestamp information received from the plurality of external devices.

Alternatively, the control unit 180 may calculate distances between the plurality of external devices by using the timestamp information.

In operation S541, the external devices A and B receiving the ultrasound signal us transmit the response signal RS. The response signal RS includes information about the timestamp and control information of the external devices.

Here, the control information may include information about a kind, control state (for example, when an external device is a TV, a power-on/off state of the TV, a kind of a received channel, information about a displayed screen, a level of volume, an output effect of a sound, etc.), and control kind (for example, when an external device is a TV, power, a switch of a channel, a change of a volume, etc.) of each of the external devices.

The control unit 180 distinguishes a plurality of external devices included in an image 200 captured by the rear camera 121*b*, based on a relative distance from the mobile terminal and information of an external device included in the response signal RS. The ultrasound signal us is transmitted to an area which overlaps a photographing area for capturing the image 200, and thus, the control unit 180 may determine the received response signal RS as being received from an external device included in the image 200. Also, the control unit 180 matches the received response signal RS with the external device included in the image 200 by using the timestamp information.

The control unit 180 generates a graphic image corresponding to each of the external devices, based on the response signal RS. The control unit 180 displays the image 200 in the display unit 151 along with the graphic image indicating the control information S562.

For example, when an air conditioner A and a TV B are sensed by the rear camera 121b, the display unit 151 displays the image acquired by the rear camera 121b, and the image 200 may correspond to a preview image for photographing. However, the present embodiment is not limited thereto. For example, when an external environment is stored as an image on the basis of a control command for photographing, the control unit 180 may control the display unit 151 so as to display the image 200 along with the graphic image 201.

Referring to FIG. 5B (a), a first graphic image 211 may correspond to a letter indicating a kind of an external device. For example, the letter may correspond to an air conditioner (A/C) and a TV. Also, the letter may correspond to an identification number (for example, a serial number) which is given to an external device when the external device is produced. When the same kind of a plurality of external devices are included in an image, the plurality of external devices may be distinguished by using the identification number.

Referring to FIG. 5B (b), a second graphic image 212 may be implemented in a modified shape of the image. For example, the second graphic image 212 may adjust a color and brightness of an area of the display unit 151 displaying an external device, or modify an edge of the external device.

Alternatively, the second graphic image 212 may include the control information. For example, based on the control information, the control unit 180 may control the display unit 151 so that a brightness of a powered-on external device is brightly displayed and a brightness of a powered-off external device is darkly displayed. Therefore, the user may recognize control information of an external device without reading a letter.

Referring to FIG. 5B (c), a third graphic image 213 may include an icon that receives a control command included in the control information. The icon may receive the user's touch input, and correspond to a detailed function of the external device. For example, the icon may correspond to an icon for adjusting a setting temperature and a wind direction of an air conditioner, an icon for switching a channel of a TV, or an icon for adjusting volume of the TV.

Based on a touch input applied to each of the first to third graphic images 211 to 213 illustrated in FIG. 5B, the control unit 180 generates a control signal for controlling each of a plurality of external devices. The control unit 180 may generate different control signals for respectively controlling the plurality of external devices, based on various types (a long touch, a dragging touch, a multi-touch, etc.) of the touch input applied to each of the first to third graphic images 211 to 213.

That is, each of the first to third graphic images 211 to 213 indicates a designated external device included in the image, and receives a control command cc for controlling the designated external device.

Therefore, in response to the response signal RS, the user may recognize a control-enabled external device, and may simply apply a control command to the external device.

Although not shown, when a control state of the external device is changed based on the control command cc, the control unit 180 additionally receives a response signal RS including the changed control information. Based on the response signal RS, the control unit 180 may control the display unit 151 so as to change the graphic image.

The above-described graphic image may be displayed by a display unit 415 of the glass type mobile terminal 400.

Hereinabove, the control method of controlling an external device by using the detection prepare request signal DPR and the control request signal rs transmitted from the mobile terminal has been described. Hereinafter, an embodiment in which a control request signal rs is transmitted from on external device will be described in detail. Here, a kind of the external device is not limited, another mobile terminal for controlling another external device may be provided.

Figure 6A:
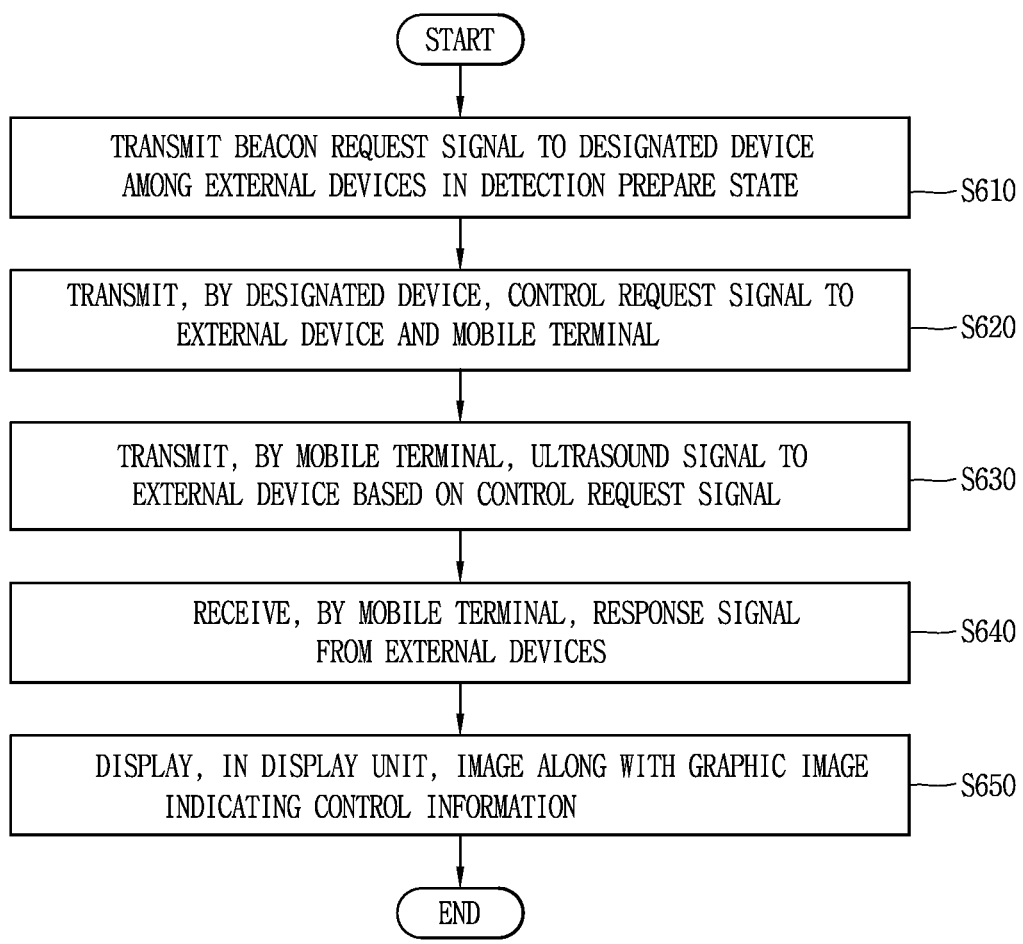
FIG. 6A is a flowchart for describing a control method of a system in a beacon mode.
Figure 6B:
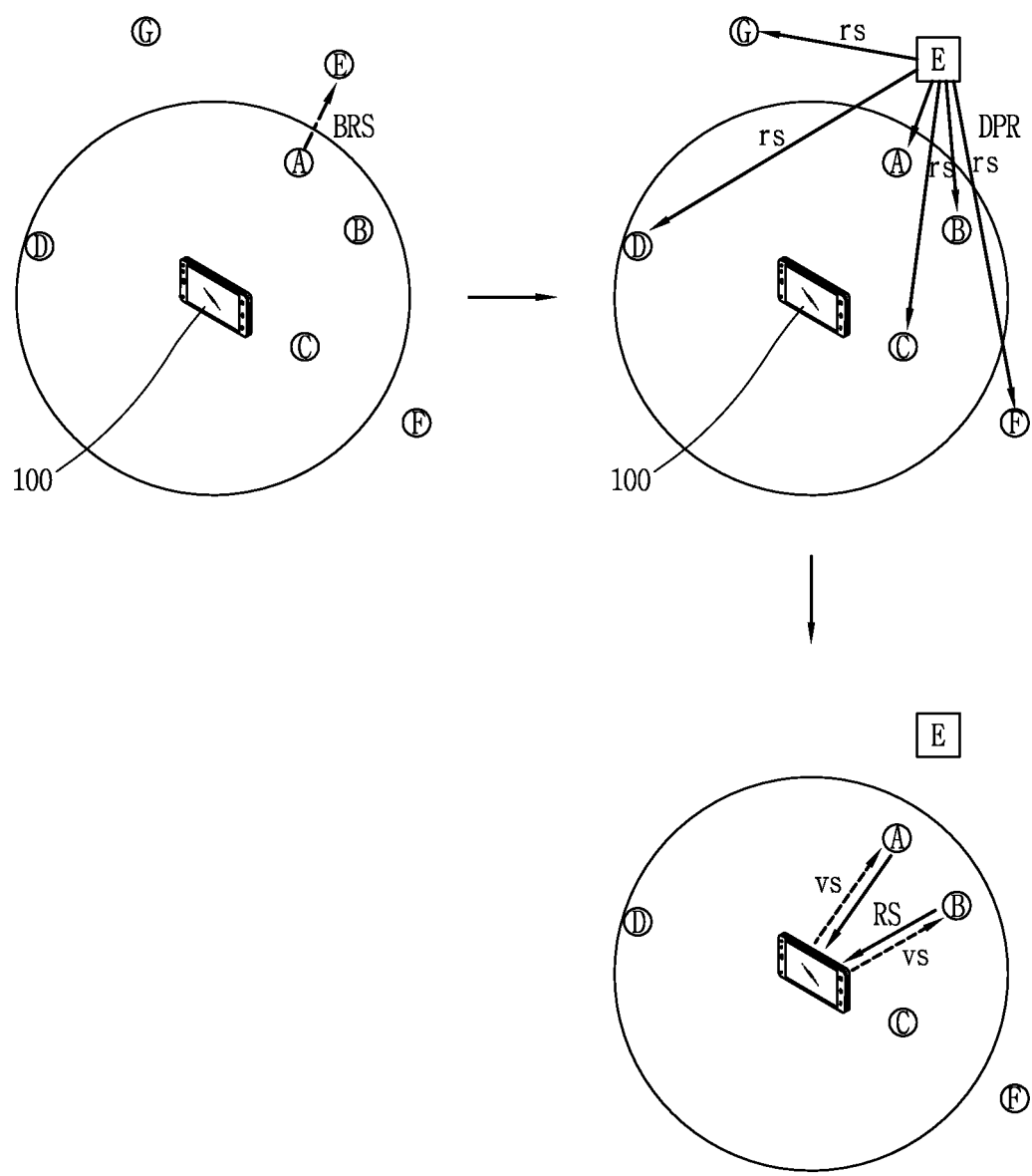
FIGS. 6B, 6C(a) and 6C(b) are conceptual views for describing the control method of FIG. 6A according to various embodiments.
Figure 6C:
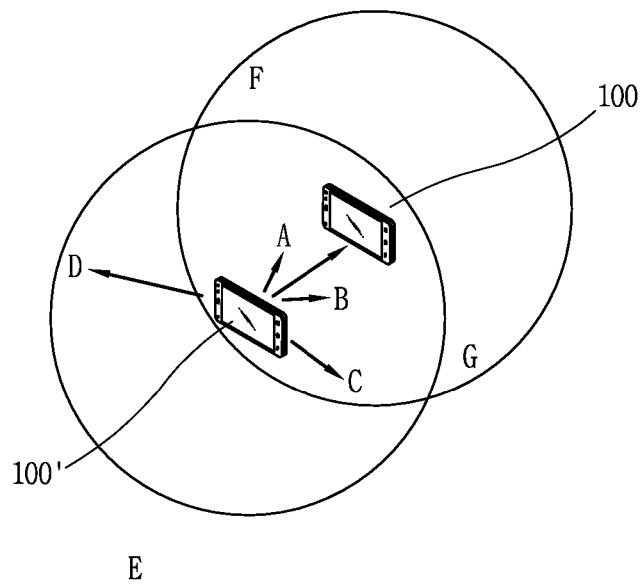
Figure 6C:
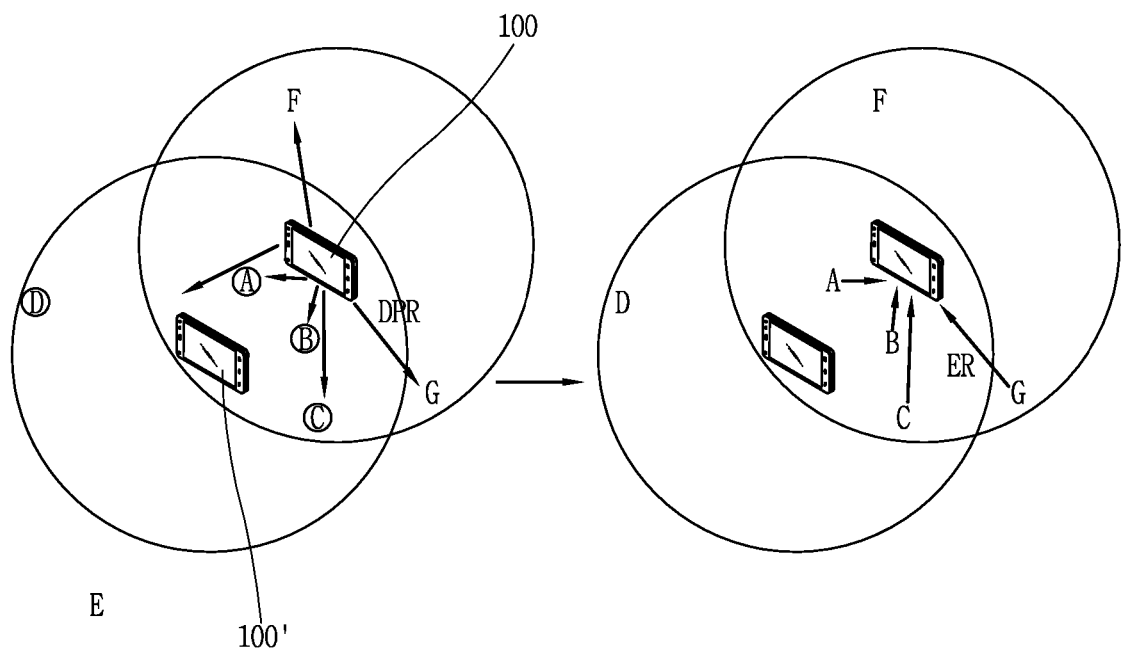

FIG. 6A is a flowchart for describing a control method of a system in a beacon mode, and FIGS. 6B and 6C are conceptual views for describing the control method of FIG. 6A according to various embodiments.

When the control unit 180 of the mobile terminal 100 transmits the detection prepare request signal DPR to the plurality of external devices A to D S620, the plurality of external devices A to D switch to the detection prepare state. Also, the plurality of external devices A to D transmit the detection prepare request signal DPR to the peripheral devices E and G, and the peripheral device G also switches to the detection prepare state.

In operation S610, the control unit 180 of the mobile terminal 100 transmits a beacon request signal BRS to a designated device E among the plurality of peripheral devices which are in the detection prepare state. The designated device E receiving the beacon request signal BRS transmits the control request signal rs to the external devices A to G and the mobile terminal 100 in operation S630. The mobile terminal 100 receiving the control request signal rs transmits the ultrasound signal us to some devices A and B. The mobile terminal immediately transmits the ultrasound signal us, based on the control request signal rs received from the outside. Therefore, a time taken in sequentially transmitting the ultrasound signal us after the control request signal rs is transmitted can be prevented from being delayed by a buffer. Accordingly, when some of the external devices receiving the ultrasound signal us generate the timestamp information, an error can be prevented from occurring due to time delay caused by the buffer, and thus, a relative position of the mobile terminal can be more accurately determined.

In operation S640, the mobile terminal 100 receives the response signal RS from the external device receiving the ultrasound signal us. In operation S650, the display unit 151 displays the image 200 along with the graphic image indicating the control information.

FIG. 6C is a conceptual view for describing a control method when a plurality of detection nodes that transmit a detection prepare request signal is provided.

FIG. 6C (a) is for describing a case in which a plurality of external devices A to G are provided, and the mobile terminal 100 and another mobile terminal 100' are provided. In this case, each of the mobile terminal 100 and the other mobile terminal 100' is defined as a detection node. Each of the mobile terminal 100 and the other mobile terminal 100' includes a transmission unit, which transmits a signal, and a reception unit which receives a signal. Therefore, the mobile terminal 100 and the other mobile terminal 100' may be a detection target for each other.

That is, the mobile terminal 100 may receive a detection prepare request signal DPR transmitted from the other mobile terminal 100'. When the control unit 180 of the mobile terminal 100 receives the detection prepare request signal DPR, the control unit 180 controls the wireless communication unit 110 so as to delay transmission of an RF signal which is to be transmitted to the external device. For example, the control unit 180 of the mobile terminal 100 limits the transmission of an RF signal to an external device for a predetermined time from a time when the detection prepare request signal DPR is received.

Therefore, the mobile terminal prevents the redundancy of the detection prepare request signal DPR transmitted to an external device, and thus can prevent the collision of detection even when a plurality of detection nodes are provided.

FIG. 6C (b) is for describing an embodiment in which a plurality of detection nodes are provided when an external device is in the detection prepare state. Referring to FIG. 6C (b), a plurality of external devices A to D receiving the detection prepare request signal DPR switches to the detection prepare state. In this case, when the detection prepare request signal DPR is again received from the mobile terminal 100, the external device transmits a response signal RS including error information ER. That is, the user of the mobile terminal 100 may recognize the external device as being controlled another detection node (another mobile terminal or a control device), based on the response signal RS including the error information ER.

Figure 7A:
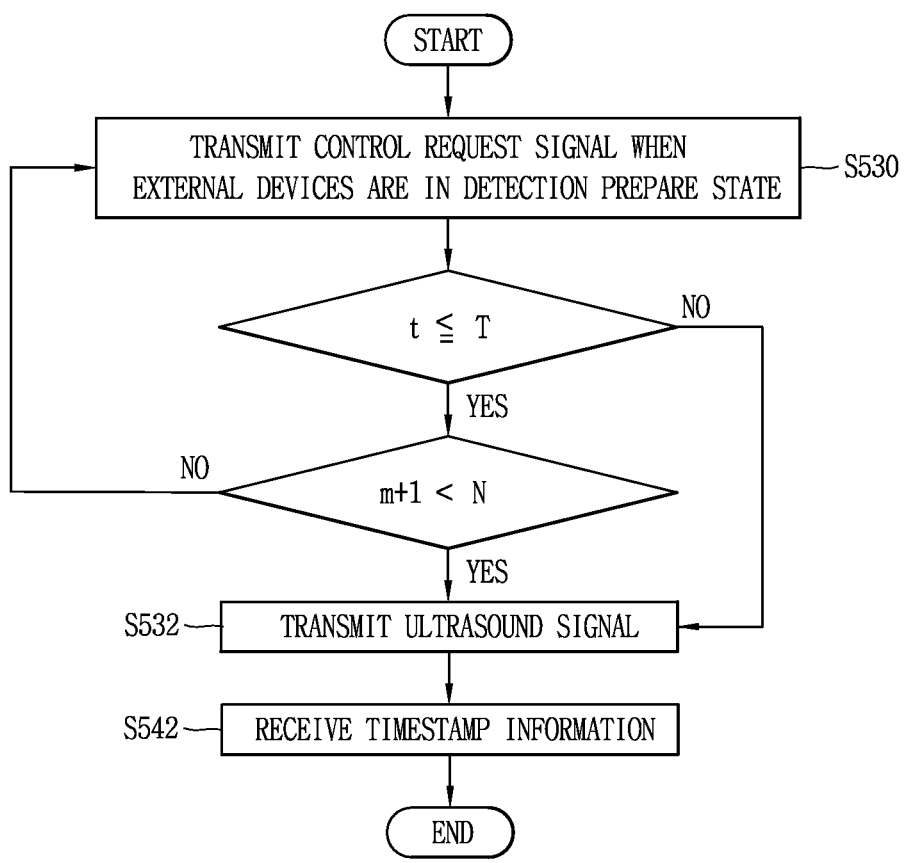
FIG. 7A is a flowchart for describing a method of controlling an external device depending on a position change of a detection node.
Figure 7B:
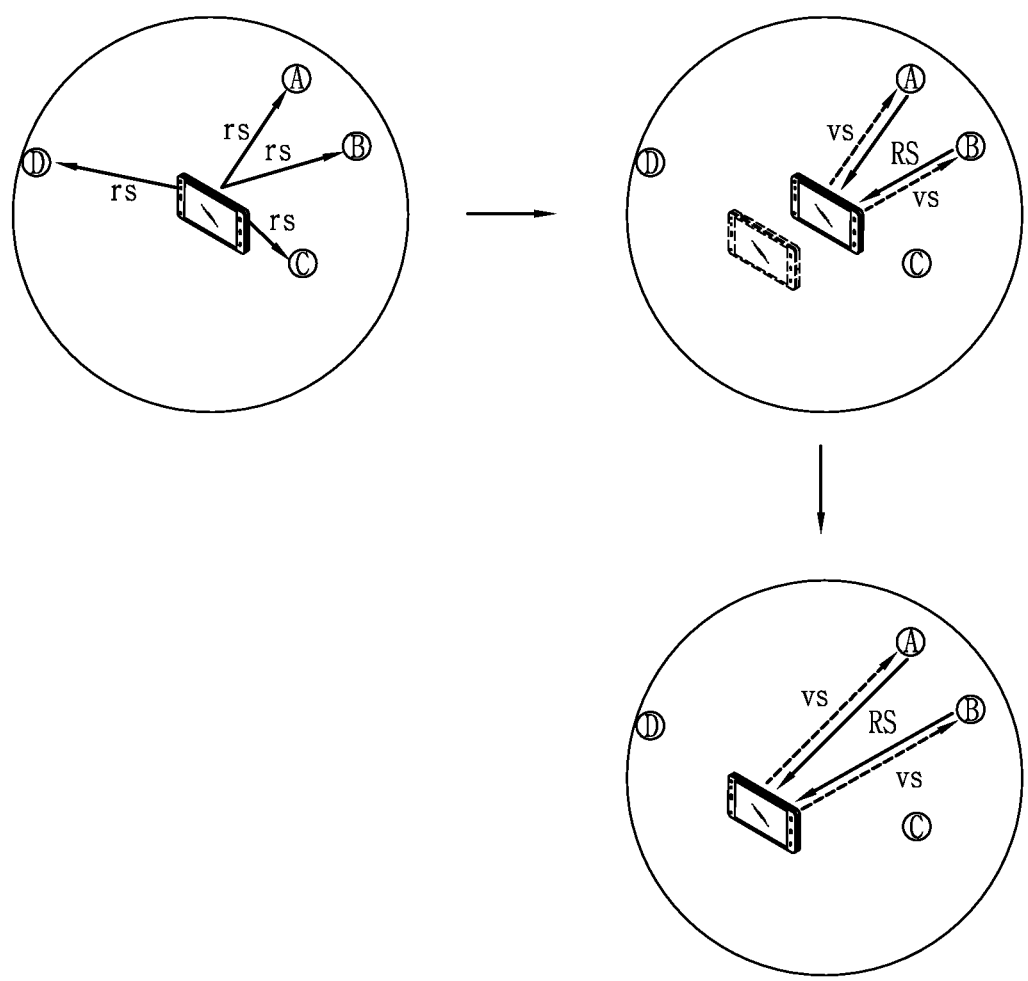
FIG. 7B is a conceptual view for describing the control method of FIG. 7A.

FIG. 7A is a flowchart for describing a method of controlling an external device depending on a position change of a detection node, and FIG. 7B is a conceptual view for describing the control method of FIG. 7A. The control method of the mobile terminal 100 according to the present embodiment corresponds to a control method for determining a position of the external device when the mobile terminal moves. For example, when a moving image is being captured by the rear camera 121b of the mobile terminal 100, the control unit 180 controls the wireless communication unit 110 so as to block the transmission of the control request signal rs and transmit the ultrasound signal us during a predetermined continuous period according to a movement of the mobile terminal 100.

Referring to FIGS. 3A and 7A, when a plurality of external devices are in the detection prepare state, the mobile terminal 100 transmits the control request signal rs to the external device in operation S530. When a time t longer than a predetermined reset time T is delayed after the control request signal rs is transmitted, the control unit 180 transmits the ultrasound signal us.

The control unit 180 stands by for the transmission of the ultrasound signal us until the reset time T elapses.

When the reset time T is equal to or longer than the delayed time t, the control unit 180 increases the number of transmissions "m" (where m is a natural number including zero), and compares m+1 with the reference number of times "N". When the number of times the reset time T elapses is less than the reference number of times "N", the control unit 180 transmits the ultrasound signal us S532.

Referring to FIGS. 6A and 7A, After the ultrasound signal us is transmitted, the control unit 180 compares the reset time T with a time t which elapses after the ultrasound signal us is transmitted. Also, the control unit 180 receives a response signal RS based on the ultrasound signal us in operation S640. That is, the control unit 180 controls the wireless communication unit 110 so as to transmit the ultrasound signal us each time the reset time T elapses. The control unit 180 limits the transmission of the control request signal rs until the reset time T elapses the reference number of times "N".

When the external device receives the ultrasound signal us, the external device calculates a timestamp of a time when the ultrasound signal us is received from the reset time T, and transmits information about the timestamp to the mobile terminal 100. When the timestamp information of the mobile terminal 100 is changed, the mobile terminal 100 determines there to be a movement of the mobile terminal 100, and continuously traces a position of the external device based on a change in the timestamp. That is, the external device may not continuously transmit control information, based on the ultrasound signal us.

When the reset time T elapses the reference number of times "N" or more, the control unit 180 controls the wireless communication unit 110 so as to again transmit the control request signal rs to the external device. In this case, the control unit 180 sets the control request signal rs as a command that releases the tracing of the position of the external device by the mobile terminal 100. Therefore, when the control request signal rs is again received, the external device may determine that the continuous reception of the ultrasound signal is stopped, and thus, the transmission of the timestamp information is stopped.

That is, the mobile terminal 100 may receive the timestamp information of the external device (S542), based on ultrasound information which is continuously received. Therefore, the mobile terminal 100 which is moving may trace a relative position of the external device which is changed.

While the rear camera 121b is being activated, when the front camera 121a senses the user's eyes, the user's eyes may be determined identically to the movement of the mobile terminal 100. That is, when the front camera 121a senses that the user's eyes are moving, the control unit 180 may control the wireless communication unit 110 so as to continuously transmit the ultrasound signal us.

Although not shown, an operation of transmitting the detection prepare request signal DPR and an operation of transmitting the control request signal rs are substantially the same as corresponding operations in the embodiment of the FIG. 6A, and thus, the description of FIG. 6A is applied to a repetitive description.

Figure 8A:
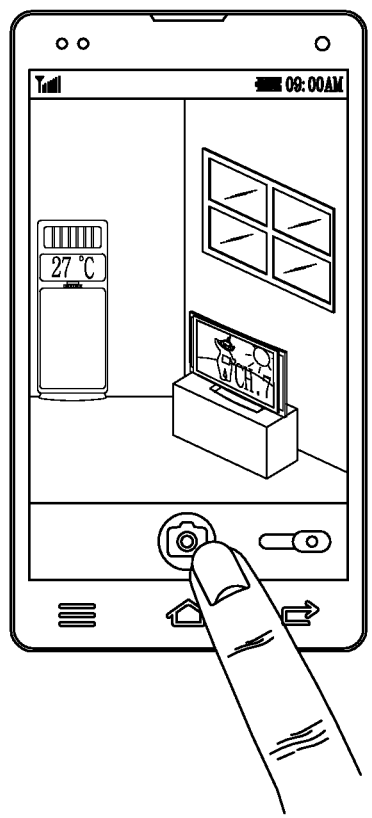
FIGS. 8A(a), 8A(b), 8A(c), 8B(a), 8B(b), 8B(c), 8B(d), 8C(a), and 8C(b) are conceptual views for describing a control method of storing control information of an external device.
Figure 8A:
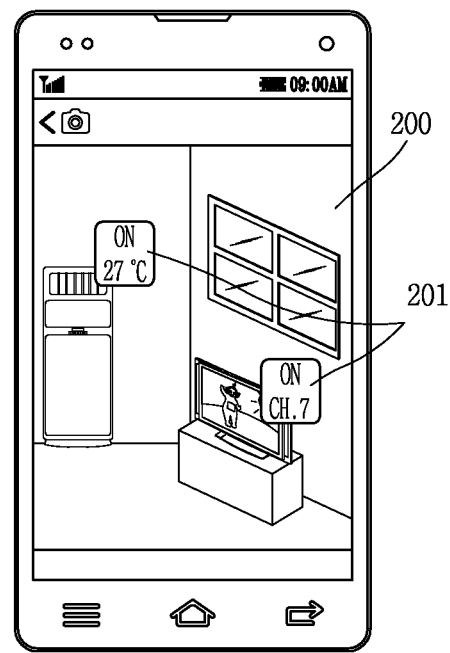
Figure 8A:
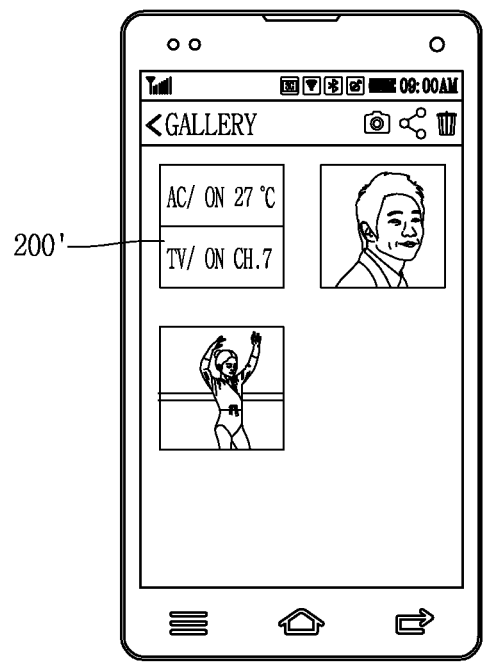
Figure 8B:
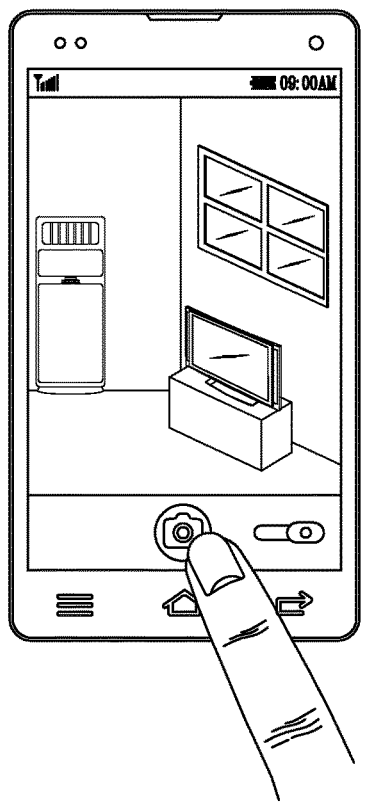
Figure 8B:
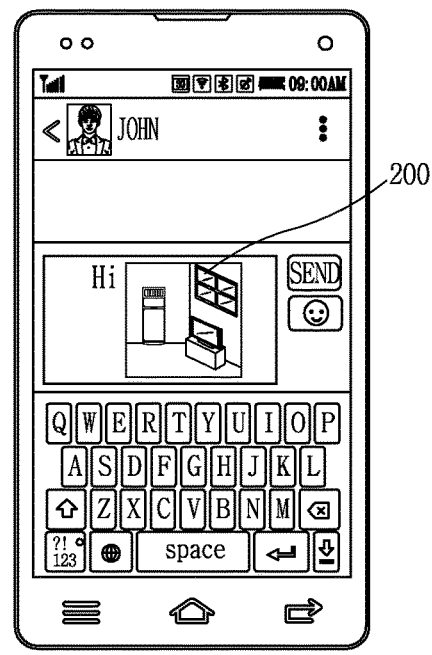
Figure 8B:
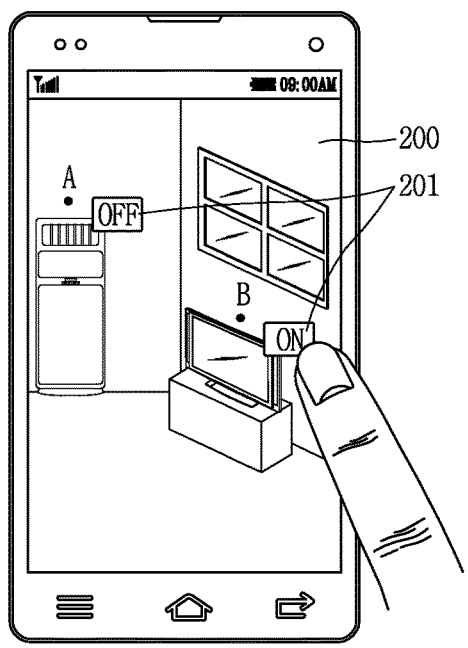
Figure 8B:
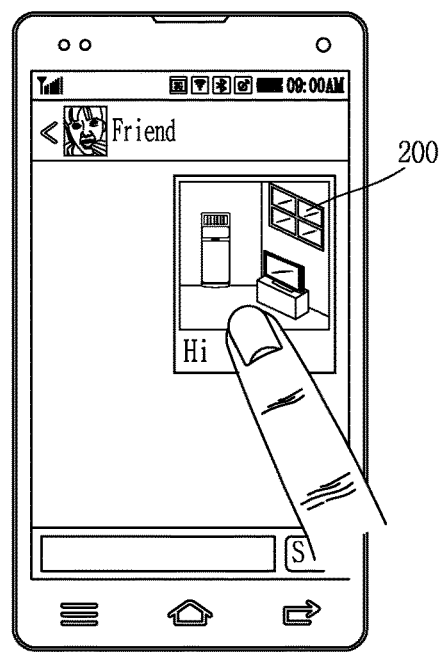
Figure 8C:
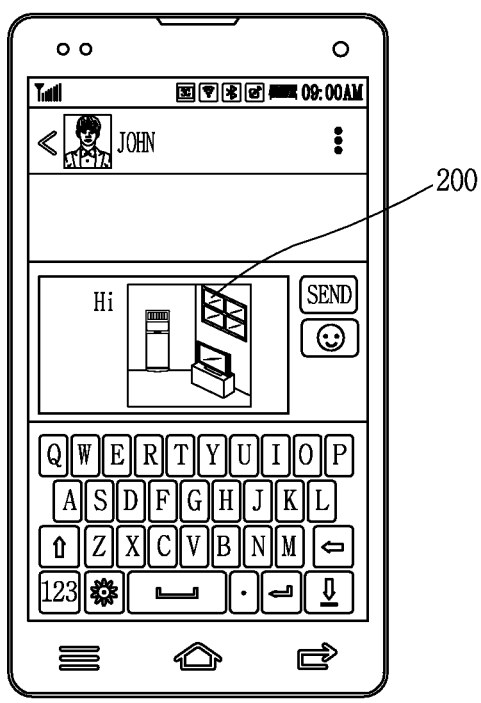
Figure 8C:
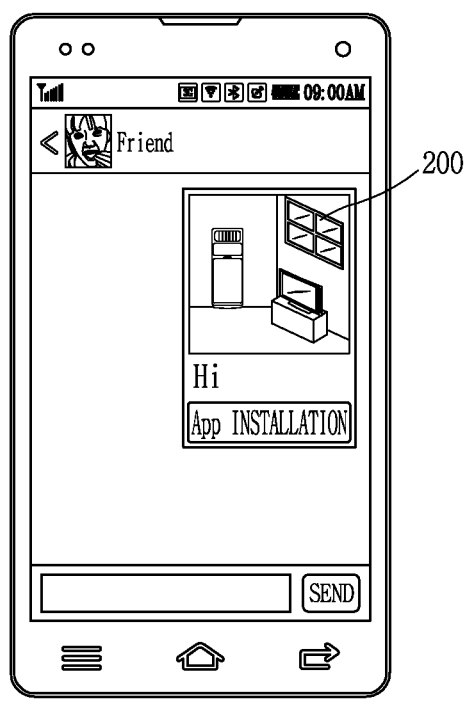

FIGS. 8A to 8C are conceptual views for describing a control method of storing control information of an external device.

A control method of storing, in a memory, control information of an external device included in an image will be described in detail with reference to FIG. 8A. Referring to FIG. 8A (a), in a state where the rear camera 121b is activated, the display unit 151 displays a preview image acquired by the camera 121. When a photographing command for acquiring an image is received, the control unit 180 controls a memory 170 so as to store the preview image as an image file.

FIG. 8A (a) is a view illustrating the display unit 151 which displays a first image file 200 stored in the memory 170. The first image file 200 includes an image obtained by photographing the external environment, for example, images of an air conditioner, a TV, a window, and a wall which are acquired at a specific angle.

Moreover, the first image file 200 includes a first graphic image 201 corresponding to an external device included in the image. For example, the first graphic image 201 may include information (for example, a setting temperature and an air volume of an air conditioner, a volume and channel information of a TV, etc.) about a power state and a specific function of the external device. The first graphic image 201 may be displayed to overlap an area of the image 200 in which the external device is displayed.

Referring to FIG. 8A (c), the first image file 200 may be stored along with other images, and an icon 200' for enlarging and outputting the first image file 200 may include information included in the first graphic image 201. For example, the icon 200' may be displayed as a text which indicates a kind of an external device corresponding to the first graphic image 201 and control information of the external device. Also, when a touch input is applied to the icon 200', the display unit 151 may display the first image file 200.

FIG. 8B is a conceptual view for describing a control method of transmitting an image file. FIG. 8B (a) is a conceptual view for describing an operation of photographing an external environment. The control unit 180 may transmit a photographed first image file to an external device, based on a control command of the user. For example, a messenger application, a message application, and a mail sending application may be used.

The control unit 180 controls the wireless communication unit 110 so as to transmit the first image file 200 and the control information of the external device, which is stored along with the first image file 200, to the external device.

Referring to FIG. 8B (c), the external device receives the first image file 200 and the control information of the external device (for example, an air conditioner or a TV) included in the first image file 200. Also, when the first image file 200 is wholly displayed by the display unit 151, the display unit 151 of the external device may display the first image file 200 along with a first graphic image 201 included in the first image file 200.

That is, the user may store an image, captured by the camera, and control information of an external device included in the image, and moreover transfer an image file including the control information to the external device.

In an operation of photographing an external environment with the camera or an operation of transmitting an image file including a control command to the outside, whether to store or transmit control information may be determined based on the user's setting.

Therefore, by using the camera, the user may acquire a photograph of an external device, which the user looks at, and control information, and moreover may acquire the control information of the external device at one time.

A control method of an external device by using an image file will be described in detail with reference to FIG. 8C. When an image file which is to be transmitted to an external device includes control information of the external device, the control unit 180 controls the wireless communication unit 110 so as to transmit the image file along with installation data of an application which controls the external device included in the image file.

That is, a third party device receiving the image file may execute the image file and the application to control the external device.

Figure 9A:
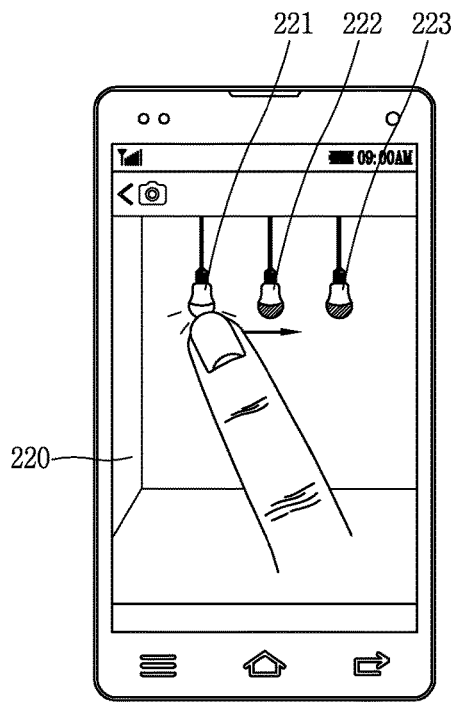
FIGS. 9A(a), 9A(b), 9A(c), 9B(a), 9B(b), 9B(c), and 9B(d) are conceptual views for describing a method of controlling an external device by using an image displayed by a display unit.
Figure 9A:
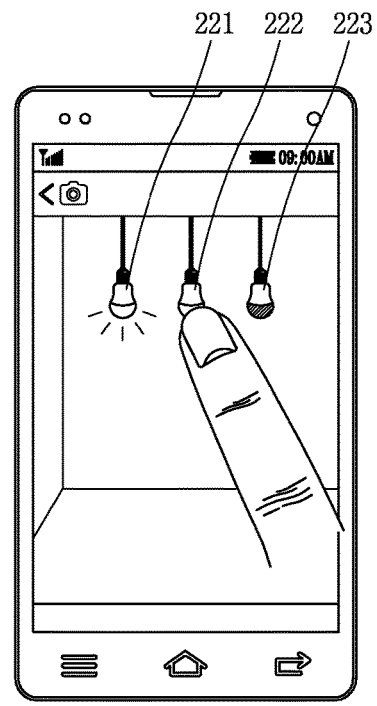
Figure 9A:
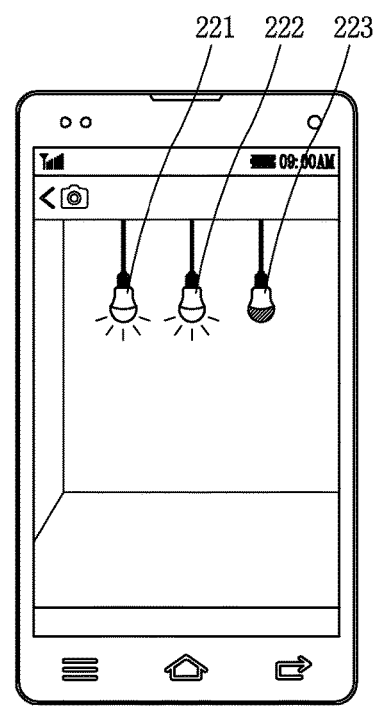
Figure 9B:
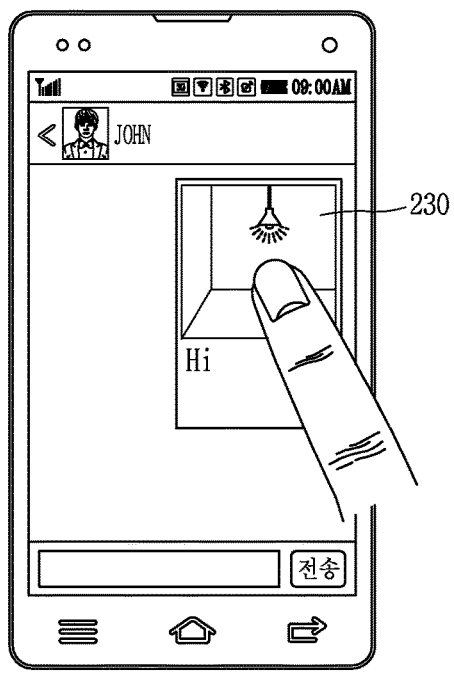
Figure 9B:
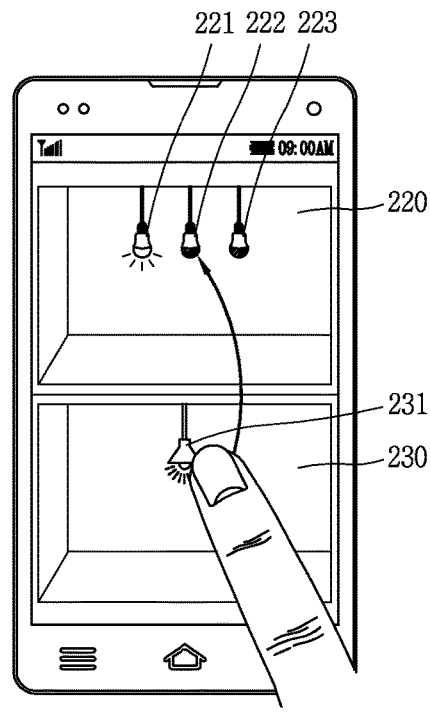
Figure 9B:
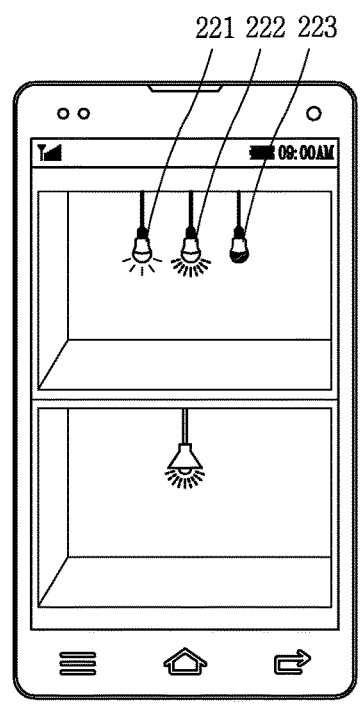
Figure 9B:
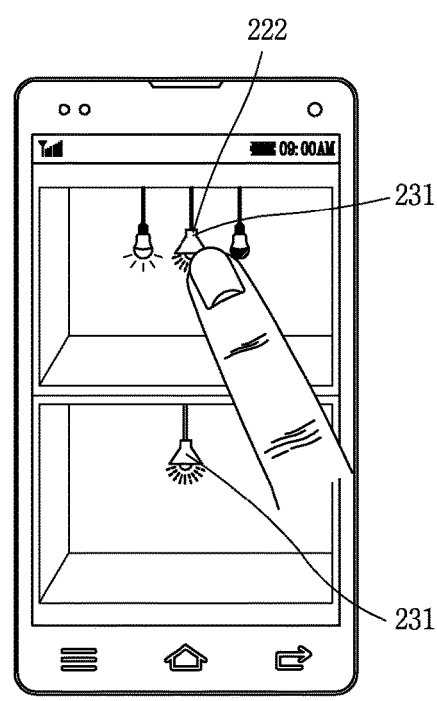
Figure 10A:
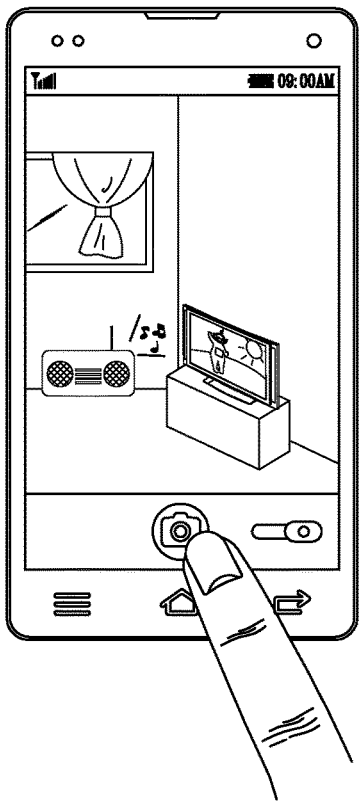
FIGS. 10(a), 10(b), 10(c), and 10(d) are conceptual views for describing a control method of controlling an external device by using control information.
Figure 10B:
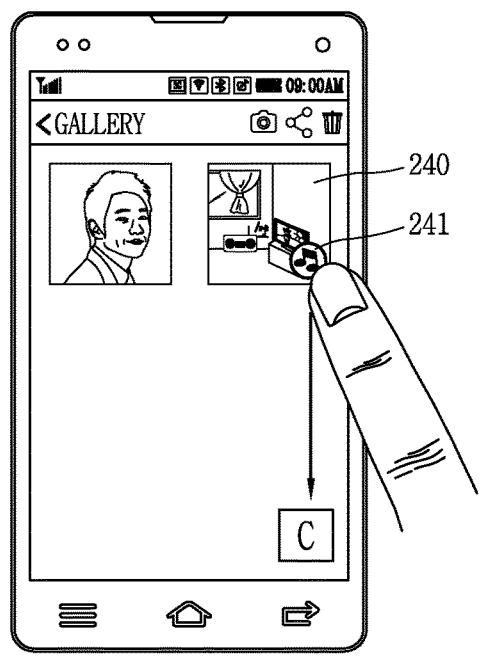
Figure 10D:
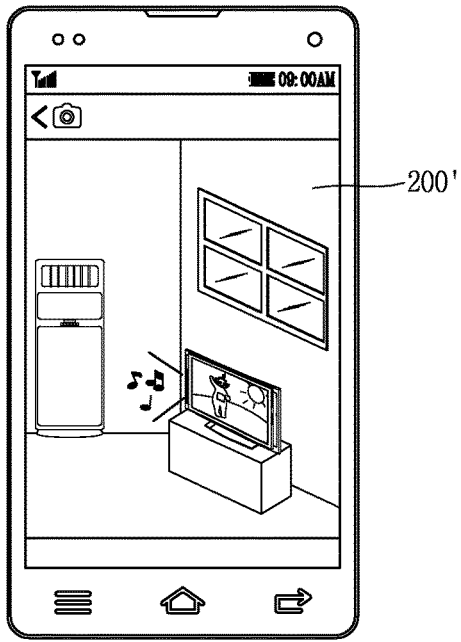
Figure 10C:
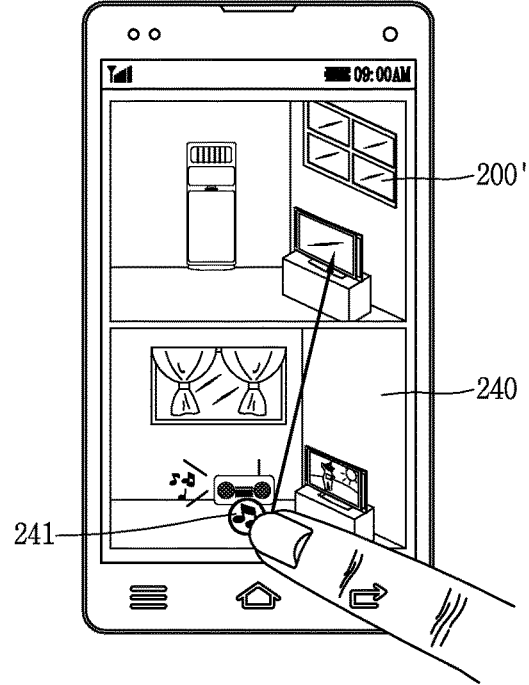
Figure 11A:
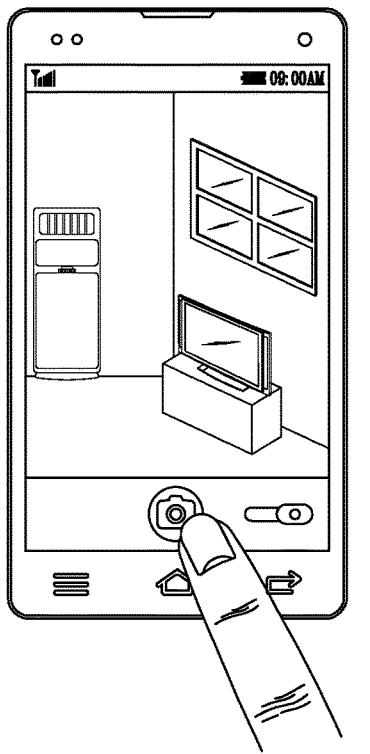
FIGS. 11(a), 11(b), 11(c), and 11(d) are conceptual views for describing a control method of acquiring control information of an external device along with an image.
Figure 11B:
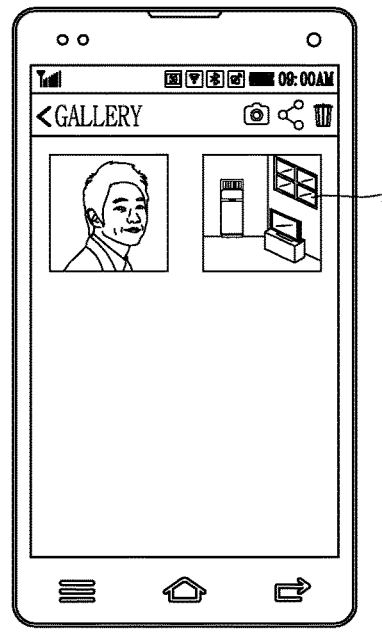
Figure 11D:
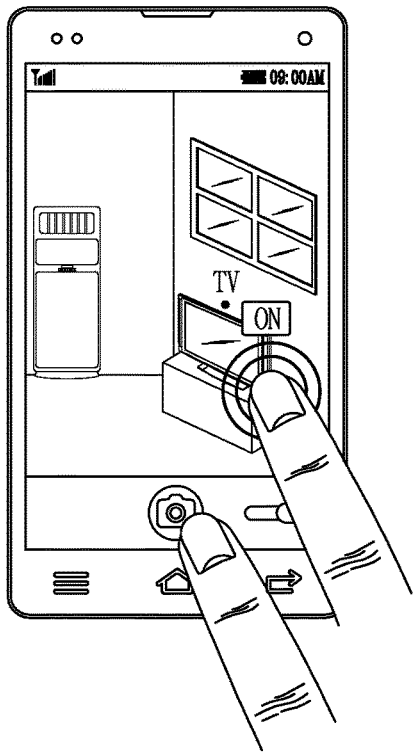
Figure 11C:
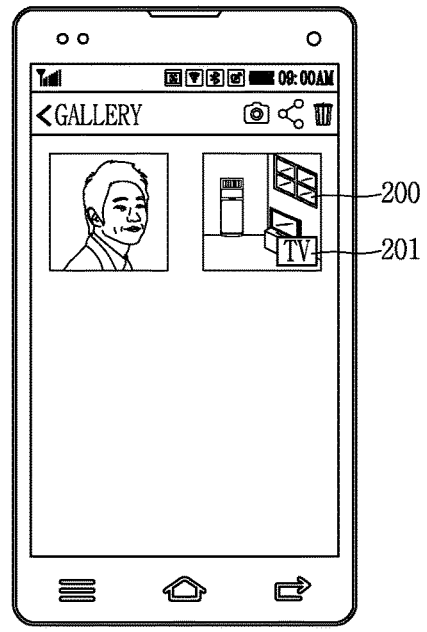

FIGS. 9A and 9B are conceptual views for describing a method of controlling an external device by using an image displayed by the display unit 151.

A control method of controlling an external device by applying a touch input to the display unit 151 displaying a captured image will be described in detail with reference to FIG. 9A. Referring to FIG. 9A (a), an image displayed by the display unit 151 includes first to third external devices 221 to 223. For example, the first to third external devices 221 to 223 may substantially correspond to devices having the same category, but the present embodiment is not limited thereto. Referring to the drawing, the first to third external devices 221 to 223 correspond to illumination. The first external device 221 is in a powered-on (ON) state, and the second and third external devices 222 and 223 are in a powered-off (OFF) state.

The control unit 180 may control the first to third external devices 221 to 223, based on a control command cc which is composed of a touch input which is continuously applied to the image.

In detail, the control command cc may correspond to a drag-type touch input which is first applied to the first external device 221, and is released in the second external device 222. When the touch input is first applied to the first external device 221, the control unit 180 remembers control information of the first external device 221, and when the touch input is released in the second external device 222, the control unit 180 controls the second external device 222 by using the control information of the first external device 221.

For example, when the control information of the first external device 221 includes data which corresponds to a powered-on state in which brightness is 10, the control unit 180 generates a control signal that allows the second external device 222 to be driven in the powered-on state where brightness is 10, based on the control command cc, and transmits the control signal to the second external device 222.

However, the present embodiment is not limited thereto. For example, when a touch input is applied to the first external device 221, the control unit 180 may output pieces of control information of the first external device 221, and the user may selectively apply some of the pieces of control information to the second external device 222.

A method of controlling an external device by using an image file will be described in detail with reference to FIG. 9B. Referring to FIG. 9B (a) and (b), based on a touch input applied to an image file 230, the control unit 180 displays the image file 230 in the display unit 151, activates the camera 121b, and controls the display unit 151 so as to output a preview image 220. For example, the display unit 151 may display the image file 230 and the preview image 220 in two divided areas. The preview image 220 includes the first to third external devices 221 to 223, and the image file 230 includes an image 231 of an external device.

The control unit 180 may control an external device acquired by the camera 121b, based on a touch input applied to the display unit 151. The control unit 180 may control the external device, based on a continuous touch input which is first applied to the image file 230 and is released in the preview image 220.

Referring to the drawing, the control unit 180 remembers control information of the image 231 of the external device, based on a continuous touch input which is first applied to the image 231 of the external device and is moved. The control unit 180 controls the display unit 151 so that the image 231 of the external device is displayed to overlap the preview image 220, based on the continuous touch input. When the image 231 of the external device is released in a state of overlapping an external device included in the preview image 220, the control unit 180 may generate a control signal that controls an external device located at a position in which the touch input is released, based on the control information.

That is, the control unit 180 may control the external device included in the preview image so as to perform a function based on stored control information of the external device, based on the touch input.

When the function based on the control information is not executed by the external device, the control unit 180 may control the display unit 151 so as to display an alarm message which notifies control being impossible. In the drawing, an embodiment of controlling different external devices is illustrated, but is not limited thereto. For example, the substantially same external devices may be controlled based on control information of the same external device which is previously stored.

Therefore, the user may store, along with an image, control information for remotely controlling an external device, and moreover may apply the stored control information to another external device. Thus, the user may store and re-drive a setting state and a function of an external device without remembering the setting state and function of the external device, and may apply a setting state and a function, which are applied to a different external device, to an external device located at a position in which the user is currently located.

FIG. 10 is a conceptual view for describing a control method of controlling an external device by using control information. Referring FIGS. 10 (a) and (b), the control unit 180 photographs an external environment, based on a photographing command. When an image 240 is stored along with the control information of the external device, the display unit 151 displays a graphic image 241 corresponding to the control information along with the image 240.

Moreover, when the image 240 which is stored along with the control information is displayed, the control unit 180 controls the display unit 151 so as to display the image 240 along with an icon C corresponding to an application which is to be executed for controlling the external device. The control unit 180 may execute the application, based on a touch input which is applied to each of the graphic image 241 and the icon C.

The control unit 180 activates the rear camera 121b, based on the execution of the application. The display unit 151 displays a preview image 200' and the image 240, which are captured by the camera, in divided areas. The graphic image 241 may be displayed on the image 240.

The control unit 180 may control an external device included in the preview image 200', based on a continuous touch input which is applied to each of the preview image 200' and the image 240.

For example, if the graphic image 241 corresponds to music reproduction information of a radio, the control unit 180 generates a control signal which allows the TV to be driven based on the music reproduction information when the continuous touch input applied to the graphic image 241 is released in an area in which the TV is displayed. The control unit 180 may search for and download a file for the music through a server, and outputs the file through the TV.

FIG. 11 is a conceptual view for describing a control method of acquiring control information of an external device along with an image.

Referring to FIG. 11 (a), the control unit 180 acquires an image of the external environment, based on a touch input applied to an icon. In this case, the control unit 180 photographs the external environment without control information of the external device.

Referring to FIG. 11 (b), the control unit 180 receives a touch input applied to an external device through the preview image. For example, the control unit 180 designates an external device included in the preview image, based on a touch input applied to the display unit 151. The control unit 180 extracts control information about the designated external device from the response signal RS, and stores the control information along with the image. That is, the control unit 180 may store only control information of an external device selected from the preview image, based on a touch input which is applied to the display unit 151 while the preview image is being displayed.

When the control information is stored, the control unit 180 may display, along with the acquired image 200, a graphic image 201 including information (a TV) of an external device which is a target of the control information.

Therefore, even when an external device is included in an image, the user may store only the image without control information, and when a plurality of external devices are included in a preview image, the user may selectively store control information of an external device.

According to the embodiments of the present invention, the control unit designates an external device located within a field of view which a user looks at by using a camera and the mobile terminal, and selectively controls the external device. Therefore, it is not required for the user to previously designate and store the external device, for controlling the external device by using the mobile terminal.

In a state where the user looks at the external device through the mobile terminal, the user may control the external device by applying a touch input to an image of the external device which is displayed by the display unit, and thus, a control signal is more intuitively transmitted to the external device.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a body;
a wireless communication unit configured to transmit or receive signals;
a first camera mounted on a first side of the body and having a predetermined viewing angle;
a display mounted on a second side of the body that is an opposite side of the first side;
an ultrasound transmission unit mounted on the first side of the body to form a transmission area; and
a controller configured to:
cause the wireless communication unit to transmit a first detection prepare request signal to a plurality of external devices located within a control area to switch the plurality of external devices to a prepare state;

cause the first camera to acquire an image including at least one of the plurality of external devices being switched to the prepare state;

cause the display to display the acquired image;

cause the ultrasound transmission unit to selectively transmit an ultrasound signal to the at least one of the plurality of external devices included in the image and disposed in the transmission area;

cause the wireless communication unit to receive associated control information from each of the at least one of the plurality of external devices that received the ultrasound signal;

cause the display to display a graphic image related to the associated control information from each of the at least one of the plurality of external devices;

select one external device from among the at least one of the plurality of external devices in response to a touch input received on the acquired image; and generate a control signal for controlling the selected external device, wherein the first camera and the ultrasound transmission unit are adjacent to each other such that the predetermined viewing angle and the transmission area are substantially same.

2. The mobile terminal of claim 1, wherein:

the displayed graphic image comprises at least a type, control state, identification number, or function associated with each of the at least one of the plurality of external devices;

a plurality of icons each associated with one of the at least one of the plurality of external devices; and at least the control state or the function is changed or performed in response to the touch input applied to the graphic image.

3. The mobile terminal of claim 1, wherein the first detection prepare request signal comprises a command that causes preferential receiving or transmitting of a radio frequency (RF) signal from the at least one of the plurality of external devices.

4. The mobile terminal of claim 1, wherein the controller is further configured to cause the wireless communication unit to transmit a control request signal after transmitting the first detection prepare request signal.

5. The mobile terminal of claim 4, wherein:

the first detection prepare request signal is transmitted prior to transmitting the ultrasound signal; and the controller is further configured to cause the wireless communication unit to receive timestamp information from each of the at least one of the plurality of external devices that receives both the ultrasound signal and the control request signal.

6. The mobile terminal of claim 5, wherein:

the timestamp information is received with the associated control information; and the controller is further configured to:

calculate distances between the mobile terminal and each of the at least one of the plurality of external devices based on the timestamp information; and match the associated control information with the corresponding at least one of the plurality of external devices based on the corresponding timestamp information.

7. The mobile terminal of claim 4, wherein:

the associated control information comprises error information when the corresponding external device receives the first detection prepare request signal when the external device already is in the prepare state with respect to another mobile terminal; and transmission of the control request signal is prevented for a predetermined time based on the error information.

8. The mobile terminal of claim 4, wherein the controller is further configured to:

cause the ultrasound transmission unit to transmit the ultrasound signal a predetermined number of times at predetermined reset time intervals; and prevent transmission of the control request signal while the ultrasound signal is transmitted the predetermined number of times.

9. The mobile terminal of claim 8, wherein the controller is further configured to recognize movement of the mobile terminal based on timestamp information received from the at least one of the plurality of external devices in response to the ultrasound signal.

10. The mobile terminal of claim 1, wherein the controller is further configured to cause the wireless communication unit to transmit a beacon request signal to a peripheral device that is located outside the control area after transmitting the first detection prepare request signal, the beacon request signal including a transmission command of a control request signal.

11. The mobile terminal of claim 10, wherein the controller is further configured to cause the ultrasound transmission unit to transmit the ultrasound signal in response to the control request signal received from the peripheral device.

12. The mobile terminal of claim 1, further comprising a second camera configured to sense motion of a user's eyes, wherein:

the first camera and the second camera are mounted on opposite sides of the mobile terminal;

the first camera and the ultrasound transmission unit are mounted on a same side of the mobile terminal; and the controller is further configured to cause the ultrasound transmission unit to change a direction in which the ultrasound signal is transmitted based on the sensed motion.

13. The mobile terminal of claim 1, wherein the controller is further configured to cause the wireless communication unit to prevent transmission of the first detection prepare request signal for a predetermined time when a second detection prepare request signal is received from another mobile terminal.

14. The mobile terminal of claim 1, further comprising a memory configured to store the control information with the image.

15. A communication system comprising the mobile terminal of claim 1, and the plurality of external devices.

* * * * *